US012725344B2

(12) United States Patent
Bocquelet

(10) Patent No.: US 12,725,344 B2
(45) Date of Patent: Sep. 1, 2026

(54) AI-ASSISTED TEXTURE GENERATION

(71) Applicant: Unity Technologies SF, San Francisco, CA (US)

(72) Inventor: Florent Benjamin Bocquelet, Chambéry (FR)

(73) Assignee: Unity Technologies SF, San Francisco, CA (US)

( * ) Notice: Subject to any disclaimer, the term of this patent is extended or adjusted under 35 U.S.C. 154(b) by 151 days.

(21) Appl. No.: 18/669,489

(22) Filed: May 20, 2024

(65) Prior Publication Data

US 2024/0386649 A1 Nov. 21, 2024

Related U.S. Application Data

(60) Provisional application No. 63/467,867, filed on May 19, 2023.

(51) Int. Cl.
*G06T 15/04* (2011.01)
*G06T 7/00* (2017.01)
(Continued)

(52) U.S. Cl.
CPC ............ *G06T 15/04* (2013.01); *G06T 7/0002* (2013.01); *G06T 15/20* (2013.01); *G06T 15/40* (2013.01);
(Continued)

(58) Field of Classification Search
None
See application file for complete search history.

(56) References Cited

U.S. PATENT DOCUMENTS 6,825,850 B2 * 11/2004 Wang .................... G06T 11/001 345/582
10,818,043 B1 * 10/2020 Barnes ...................... G06T 7/40
(Continued)

OTHER PUBLICATIONS

Pan, Xingang, et al., "Drag Your Gan: Interactive Point-based Manipulation on the Generative Image Manifold", arXiv:2305.10973v1, [Online]. Retrieved from the Internet: <URL: https://huggingface.co/papers/2305.10973>, (May 18, 2023), 11 pgs.
(Continued)

*Primary Examiner* — Jason A Pringle-Parker
(74) *Attorney, Agent, or Firm* — Schwegman Lundberg & Woessner, P.A.

(57) ABSTRACT

An AI-assisted texture generation system and method that generates a texture for an object such as a 3D mesh. At a given iteration, the system renders, from a viewpoint, one or more of an object depth and a cumulative texture associated with a cumulative pixel quality map; determines an estimated pixel quality map associated with the viewpoint; generates, at the viewpoint, a new texture associated with the object based on one or more of the object depth, the cumulative texture, and a refine mask; updates the cumulative texture based on the new texture; and updates the cumulative pixel quality map based on the estimated pixel quality map. In some examples, the refine mask is computed based on the cumulative pixel quality map and an estimated pixel quality map. In some examples, the new texture is generating using an augmented inpainting diffusion model for image generation.

18 Claims, 19 Drawing Sheets

(51) Int. Cl.
*G06T 15/20* (2011.01)
*G06T 15/40* (2011.01)

(52) U.S. Cl.
CPC ............... *G06T 2207/20081* (2013.01); *G06T 2207/20084* (2013.01); *G06T 2207/30168* (2013.01)

(56) References Cited

U.S. PATENT DOCUMENTS

| | | | | |
|---|---|---|---|---|
| 2018/0253886 A1* | 9/2018 | Hu | ........................ | G06T 11/001 |
| 2019/0213778 A1* | 7/2019 | Du | .......................... | G06T 15/04 |
| 2024/0005593 A1* | 1/2024 | Yu | ........................... | G06T 19/20 |

OTHER PUBLICATIONS

Richardson, Elad, et al., "TEXTure: Text-Guided Texturing of 3D Shapes", Tel Aviv University. arXiv:2302.01721v1, (Feb. 3, 2023), 1-13.

* cited by examiner

VIEWPOINT 1

AI-ASSISTED TEXTURE GENERATION

CROSS REFERENCE TO RELATED APPLICATIONS

This application claims the benefit of U.S. Provisional Application Ser. No. 63/467,867 filed on May 19, 2023, which is incorporated herein by reference in its entirety.

TECHNICAL FIELD

The disclosed subject matter relates generally to the technical field of computer graphics and, in one specific example, to a system for AI-assisted texture generation.

BACKGROUND

Texture generation systems for objects or three-dimensional (3D) models seek to produce high-quality textures that reflect a user's artistic intent, and/or respect other user-provided guidance.

BRIEF DESCRIPTION OF THE SEVERAL VIEWS OF THE DRAWINGS

Some embodiments are illustrated by way of example and not limitation in the figures of the accompanying drawings.

DETAILED DESCRIPTION

Figure 1:
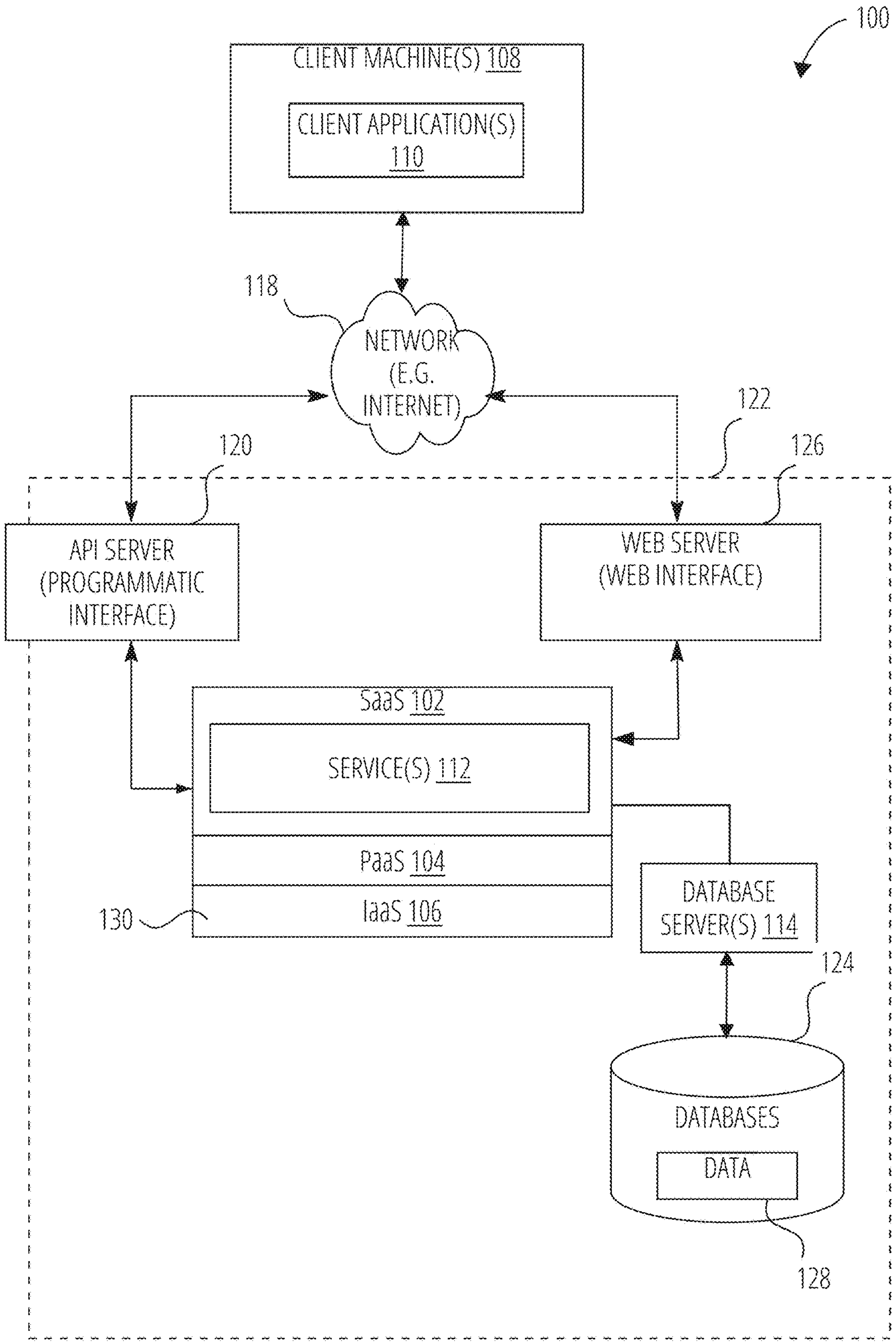
FIG. 1 is a network diagram illustrating a system within which various example embodiments may be deployed.

Texture generation systems for objects and/or 3D models seek to produce high-quality textures that reflect a user's artistic intent and/or respect user-provided constraints. Recent advances in image generation have resulted in models able to generate high quality images in camera view space (e.g., natural space), allowing users to experiment with artistic styles and/or image types. However, such image generation models perform less well in other spaces, such as the UV space of an object (e.g., texture space), which can be a useful space to specify and/or integrate user-provided constraints. For example, an input object such as a 3D mesh can be accompanied by a provided unwrapping corresponding to a projection of the object into UV space, the unwrapping reflecting a set of desired characteristics and/or constraints.

Therefore, there is a need for a texture generation system that can take as input an object (e.g., a 3D mesh) and/or an accompanying object unwrapping (e.g., a projection to the UV space of the object) and generate a texture image that be applied to the object to obtain its final appearance while preserving the constraints reflected by the unwrapping. The texture generation system should also be able to accommodate user guidance and/or input throughout the texture generation process, in order to ensure that the final generated texture aligns with user goals.

Examples in the disclosure herein pertain to a texture generation system that generates textures for one or more objects or 3D models. The texture generation system takes as input an object (e.g., a 3D mesh) and/or an associated object unwrapping (e.g., a projection into UV space of the 3D mesh). The texture generation system generates a texture image to be applied to the object (e.g., 3D mesh) to obtain the object's final appearance, while preserving the characteristics or constraints reflected by the unwrapping. In some examples, the texture generation system constructs the final texture in an iterative fashion. At each iteration, the texture generation system generates a new texture image, corresponding to an appearance of the object from a new viewpoint. In some examples, the generation step takes into account a cumulative texture image corresponding to a combination of all previously generated texture images for the previously considered viewpoints. In some examples, the generation step conditions the new texture generation on the object depth (e.g., with respect to the new viewpoint), thus informing the generation process of the object's geometry. By using the cumulative texture and/or the object depth, the texture generation system ensures the global consistency of the final generated texture. For example, the final generated texture is not patchy or inconsistent, and/or the transitions between viewpoints are smooth.

In some examples, the texture generation system can use an image generation module to generate, in view space, a new texture image based on a new viewpoint and/or a current version of a cumulative texture for the object rendered from the new viewpoint. In some examples, the texture generation process is iterative. At each iteration, the texture generation system guides the generation of the new texture image for the new viewpoint using a refine mask that indicates which portions of the cumulative texture should be kept, regenerated and/or refined. The texture generation system projects the generated new texture image to the UV space of the object (e.g., the texture space). The texture generation system combines, in UV space or texture space, the projected new texture image with the cumulative texture to generate an updated cumulative texture, thereby incorporating the output of the current texture generation step into the overall texture generation output. The iterative texture generation process progresses to the next iteration, taking into account the updated cumulative texture and/or an additional viewpoint. In some examples, the texture generation system uses a fully automatic texture image generation process that continues until a predetermined convergence criterion is met.

In some examples, the texture generation system is interactive, allowing for fine user access control. The texture generation system can elicit and/or incorporate user selections of one or more viewpoints for texture image generation. The system can enable and/or incorporate user modifications to the generated texture(s) at various points during the texture generation process. The system can elicit and/or use a user decision as to when the cumulative texture is of sufficiently high quality and/or completeness to be automatically transmitted to a downstream application and/or displayed to the user.

Thus, the AI-assisted texture generation system described herein provides enhanced user control and/or iterative refinement capabilities with respect to existing solutions. The system ensures global consistency and high-quality texture generation through its use of cumulative textures and/or cumulative pixel quality maps. Additionally, the interactive nature of the system allows users to input and modify parameters throughout the texture generation process, ensuring that the final product closely aligns with initial and/or evolving artistic intentions and specific constraints. This level of customization and control is a substantial improvement over existing solutions, making the system particularly valuable for complex graphic design and 3D modeling tasks.

Examples

In some examples, the texture generation system operates in an iterative fashion. At each iteration, it renders, at a viewpoint, one or more of an object depth and a cumulative texture associated with a cumulative pixel quality map; determines an estimated pixel quality map associated with the viewpoint; generates, at the viewpoint, a new texture associated with the object based on one or more of at least the object depth, the cumulative texture, and a refine mask; updates the cumulative texture based on the new texture; and updates the cumulative pixel quality map based on the estimated pixel quality map.

In some examples, the estimated pixel quality map associated with the viewpoint is computed based on one or more of position data associated with the viewpoint, a cumulative texture resolution, a new texture resolution, and a mapping from a view space associated with generating the new texture to a UV space (e.g., texture space) associated with the cumulative texture. In some examples, computing the estimated pixel quality map includes computing a position of each pixel of the new texture based on pixel coordinates in the texture space and on the cumulative texture resolution; computing a pixel quality ratio based on a maximum magnitude of discrete derivatives of the position of the pixel along a first coordinate axis and a second coordinate axis; computing an indicator of a facing direction of the pixel with respect to the viewpoint; and computing an estimated pixel quality value for the pixel based on the pixel quality ratio and the indicator of the facing direction of the pixel with respect to the viewpoint.

In some examples, the refine mask is computed based on the cumulative pixel quality map and the estimated pixel quality map. For example, based on determining that a pixel quality value in the cumulative pixel quality map indicates that a pixel has not been previously generated, the refine mask value for the pixel is set to be a first value indicating the pixel is to be generated. If the respective pixel quality value is greater or equal to a corresponding pixel quality value in the estimated pixel quality map, the refine mask value for the pixel is set to a second value indicating the pixel is not to be generated and/or updated. If the pixel quality value is lower than the corresponding pixel quality value in the estimated pixel quality map, the refine mask value for the pixel is set to be a third value indicating the pixel is to be refined.

In some examples, the texture generation system generates the new texture image using an image generation model and/or image generation parameters such as natural language (NL) input (e.g., prompt) or a number of iterations. In some examples, the texture system can augment and/or customize an existing and/or third-party high-performing image generation model for the purpose of texture generation. Using augmented or customized versions of trained image generation models can reduce the need for task-specific training and/or new dataset construction. In some examples, the image generation model can be an inpainting diffusion model. Generating the new texture image can include generating a binary mask based on the refine mask and a pre-determined threshold. At each iteration of the inpainting diffusion model, a masked texture can be generated based on the cumulative texture and the binary mask. A version of the new texture image can be generated based at least on the masked texture image and the binary mask. At a follow-up iteration, the threshold can be updated (e.g., reduced) and/or the binary mask can be updated based on the refine mask and on the updated threshold. The masked texture image can be generated or updated based on the updated binary mask. The new texture image can be updated or re-generated based on the new masked texture image and the updated binary mask. After the inpainting diffusion model completes its iterations, the final version of the new texture can image be retrieved, stored and/or displayed to the user.

In some examples, the texture generation system projects the new texture image and/or the estimated pixel quality map corresponding to the viewpoint to the object's UV space (e.g., to texture space). Updating the cumulative texture is performed in UV space (or texture space) based on the resulting projected new texture. Updating the cumulative pixel quality map is performed in UV space (or texture space) based on the resulting projected new pixel quality map.

In some examples, updating the cumulative texture based on the projected new texture includes computing an updated value of each pixel of the cumulative texture. For example, based on determining that a pixel was not generated for the projected new texture, the texture generation system retains, as the updated value, the value of the pixel in the cumulative texture. If the pixel quality value in the cumulative pixel quality map is determined to be lower than the corresponding pixel quality value in the projected new pixel quality map, the pixel value in the updated cumulative texture is set to the value of the pixel in the projected new texture. If the difference between the quality value of the pixel of the cumulative texture and a lower corresponding pixel quality value in the projected new pixel quality map for the projected new texture is determined to be smaller than a predetermined threshold, the pixel value in the updated cumulative texture is set to be a linear combination of the value of the pixel for the projected new texture and the value of the pixel for the cumulative texture. If the difference exceeds the threshold, the pixel value in the updated cumulative texture can remain that in the current cumulative texture. In some examples, updating the cumulative pixel quality map based on the projected new pixel quality map uses a similar method.

Figure Summary

The summary below groups figures by their contribution to depicting the system's network setup, core operational components, iterative texture generation process, projection techniques, refinement strategies, user interaction features, software architecture, hardware requirements, and machine-learning integration.

FIG. 1 depicts the overall network architecture, showing how the texture generation system integrates within a networked environment with servers and software services.

Figure 2:
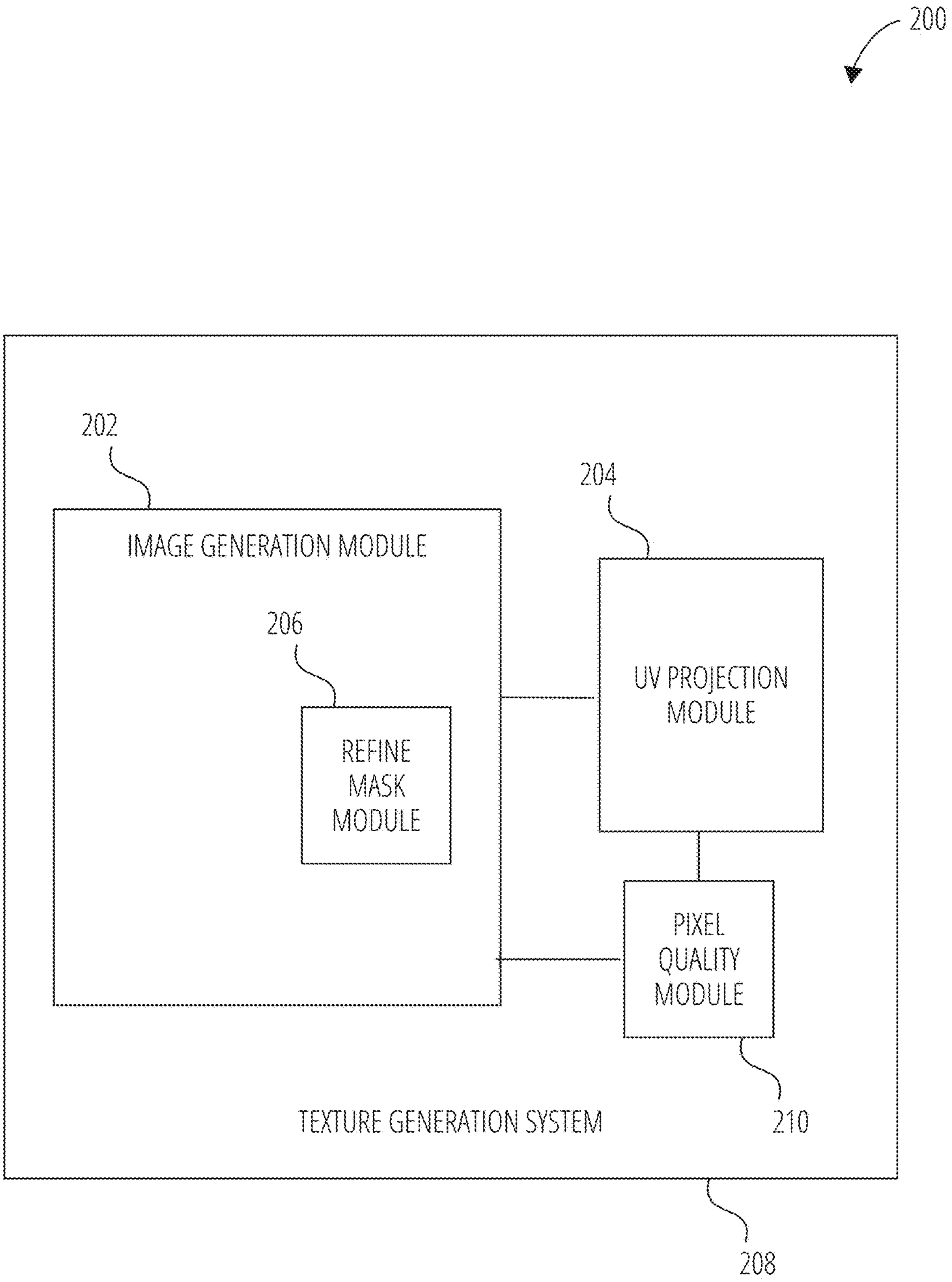
FIG. 2 is a diagrammatic representation of a texture generation system, according to some examples.

FIG. 2 outlines the core components of the texture generation system, including modules for image generation, UV projection, pixel quality assessment, and/or refine mask application.

FIG. 3-FIG. 10 collectively illustrate the iterative texture generation process for an object in the context of successive viewpoints. They detail initializing textures and quality maps, rendering object depth, generating new textures, updating cumulative textures and/or cumulative pixel quality maps for multiple viewpoints, and so forth.

Figure 11:
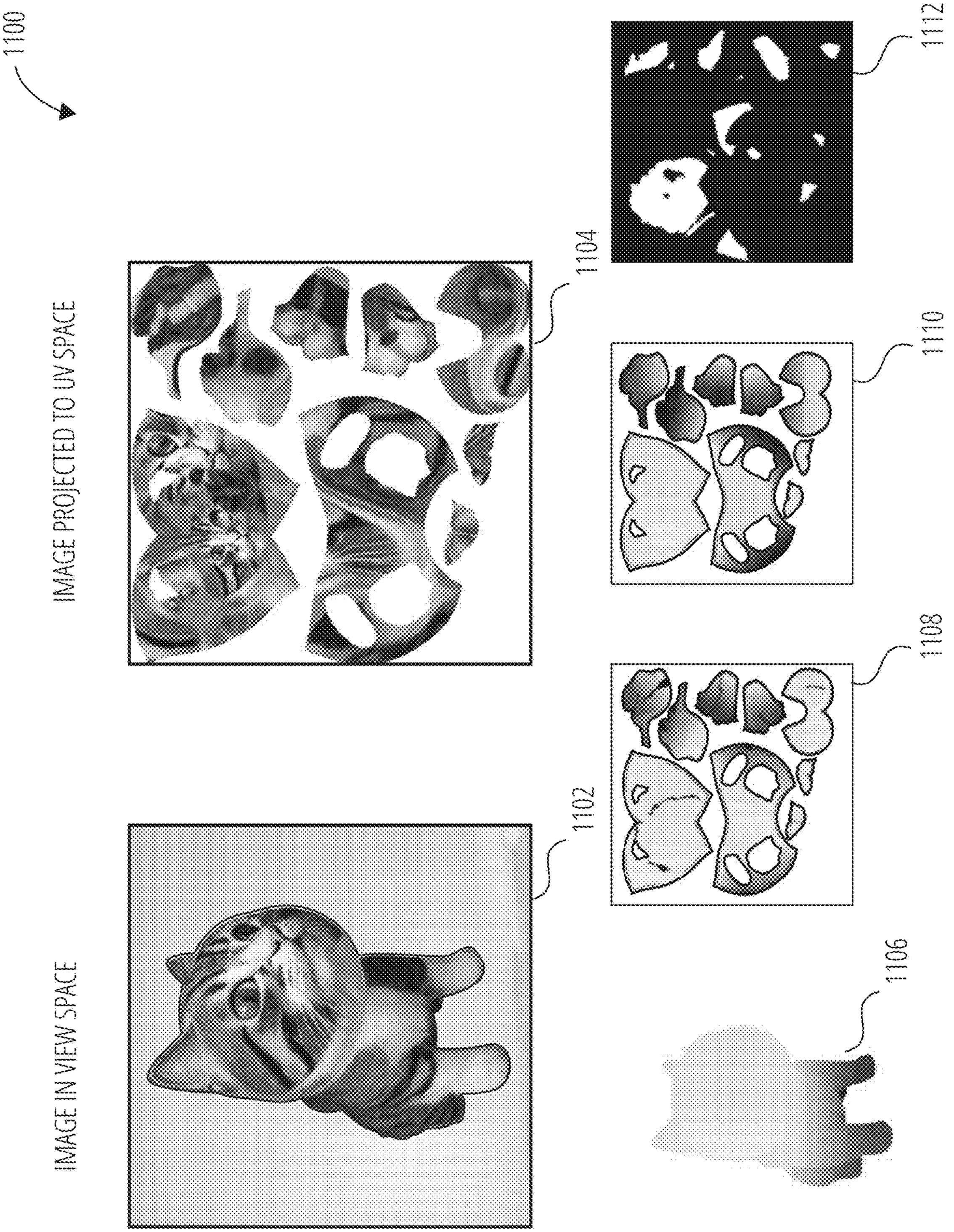
FIG. 11 is an illustration of aspects of a method for projecting from view space to UV space for an object, according to some examples.

FIG. 11 exemplifies aspects of a method for projecting from view space to UV space, the method being used to align textures with the object's UV map.

Figure 12:
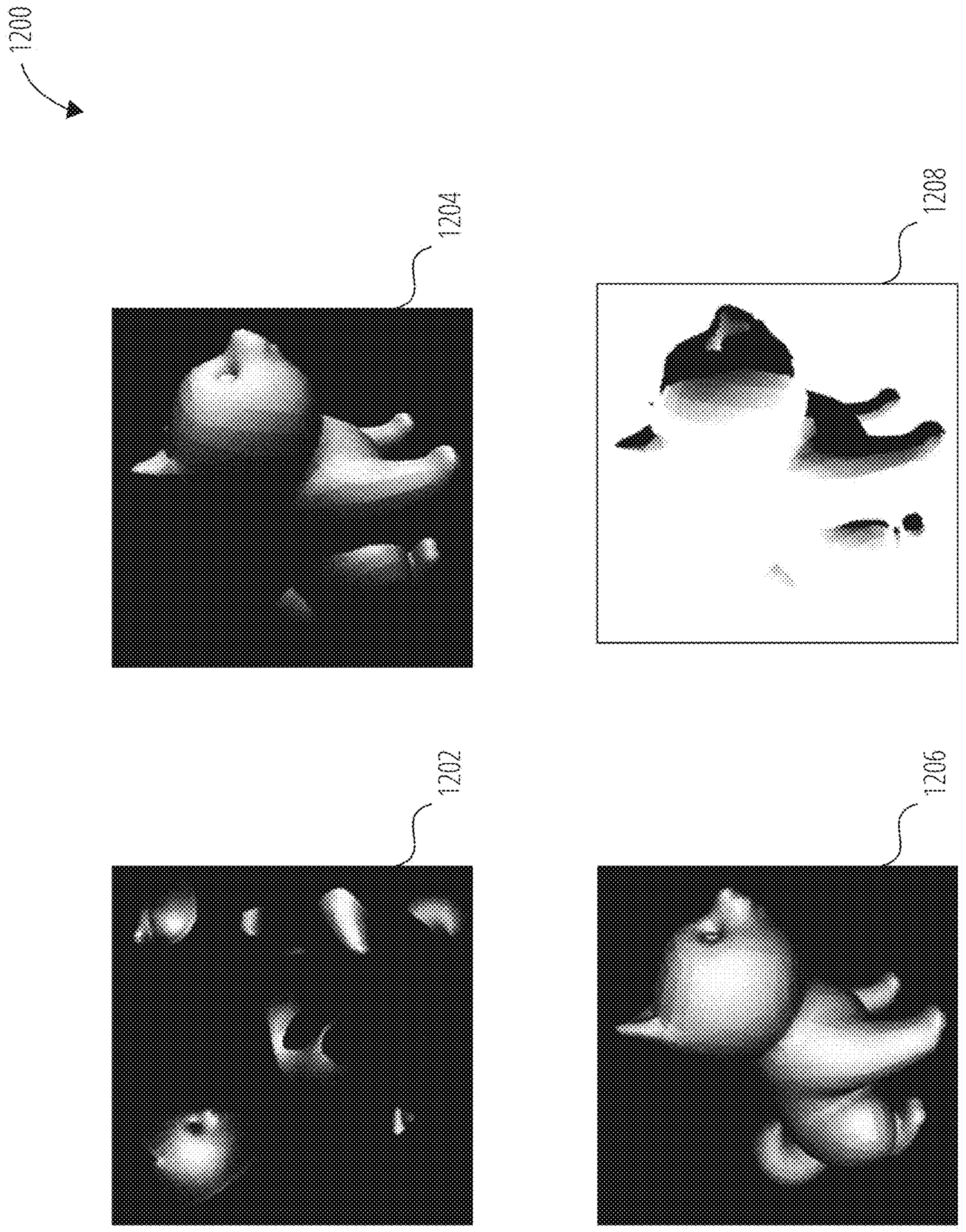
FIG. 12 is an illustration of a refine mask, according to some examples.
Figure 13:
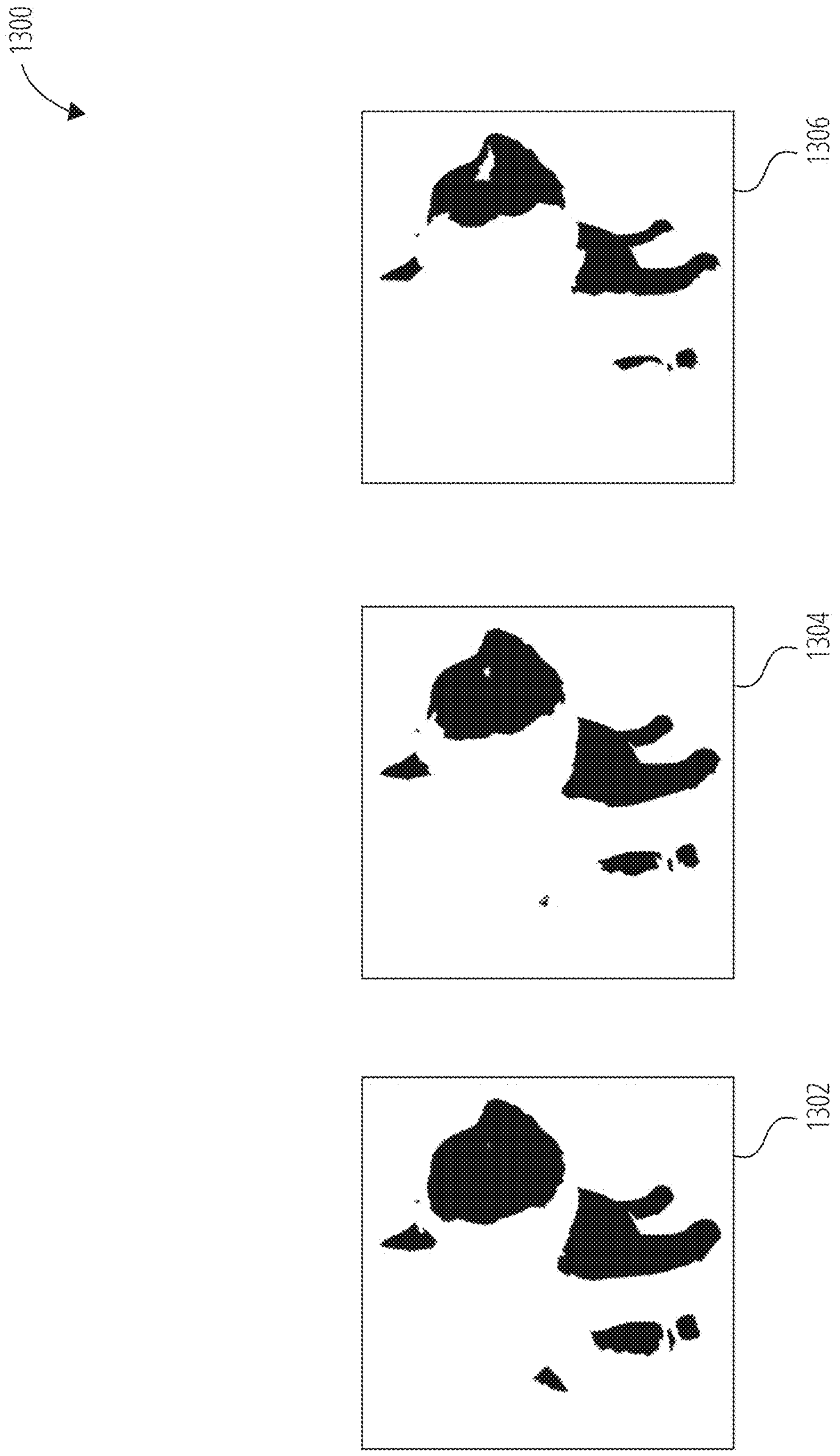
FIG. 13 is an illustration of aspects of an image generation method using a refine mask, according to some examples.
Figure 14:
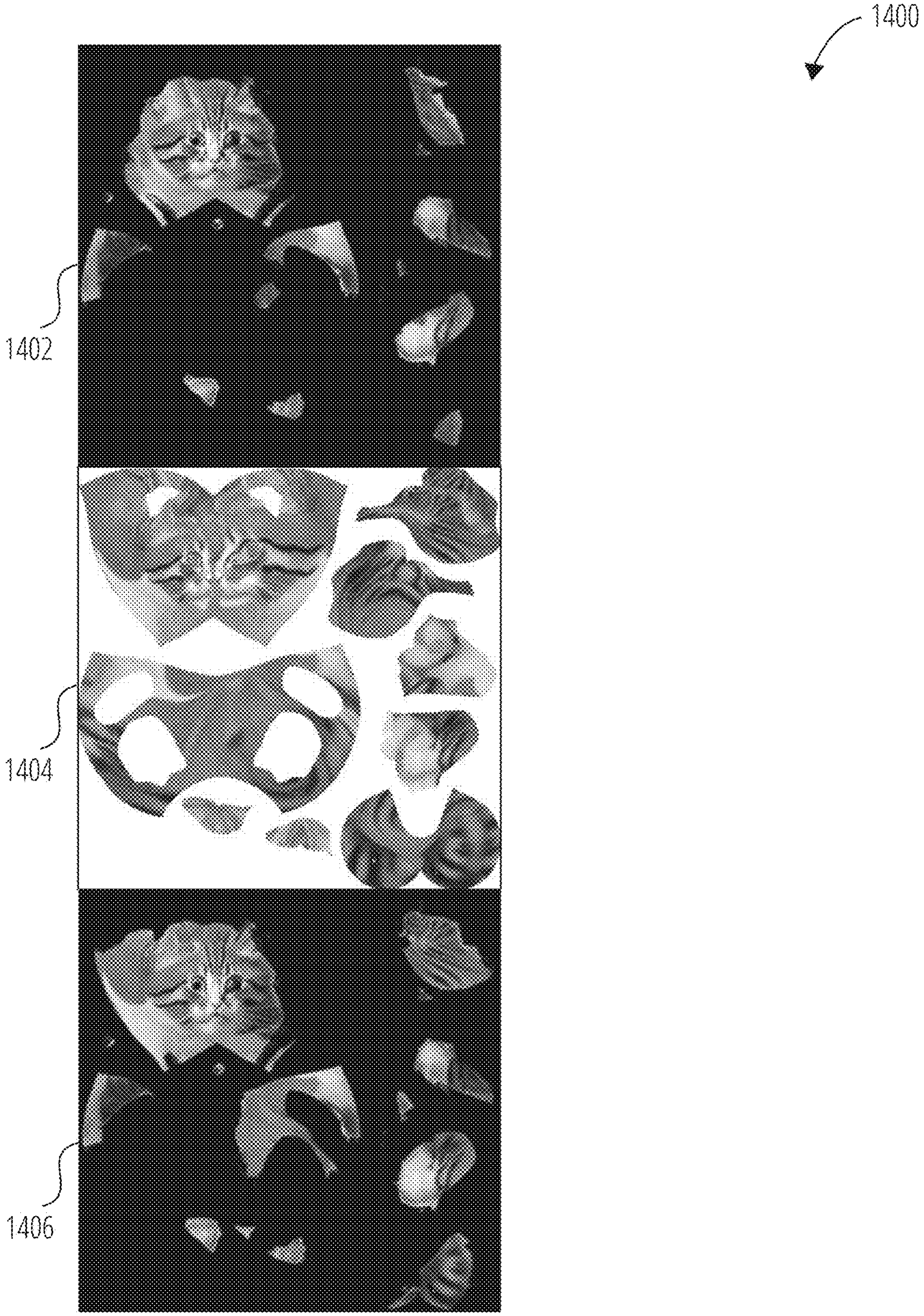
FIG. 14 is an illustration of aspects of a texture fusing method, according to some examples.

FIG. 12 to FIG. 14 illustrate aspects of refinement and/or integration processes, showing how refine masks are computed and used to guide texture generation and/or inpainting, and/or how textures are fused, ensuring quality and consistency.

Figure 15:
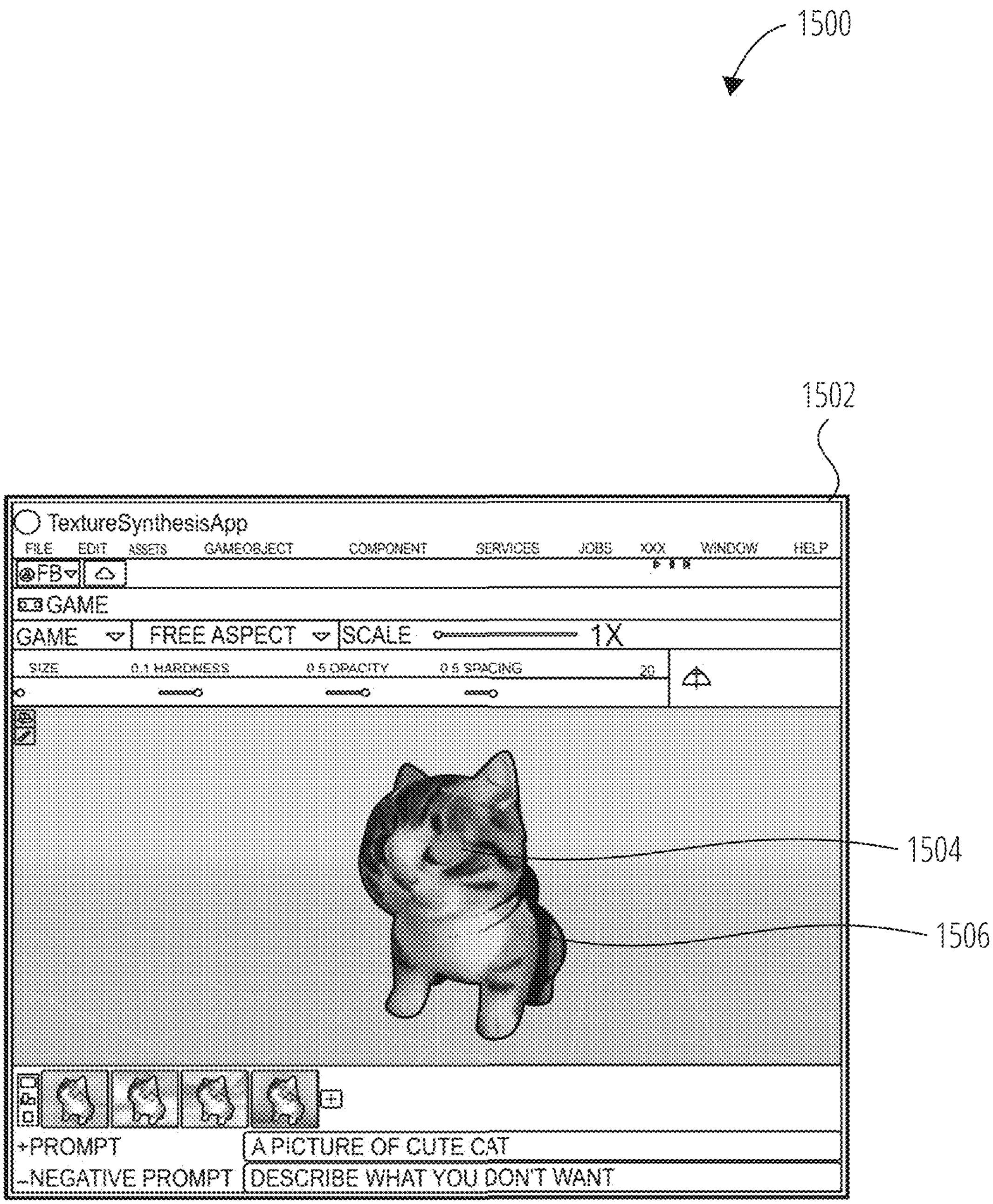
FIG. 15 is an illustration of a user interface (UI) screen for a texture generation system, according to some examples.
Figure 16:
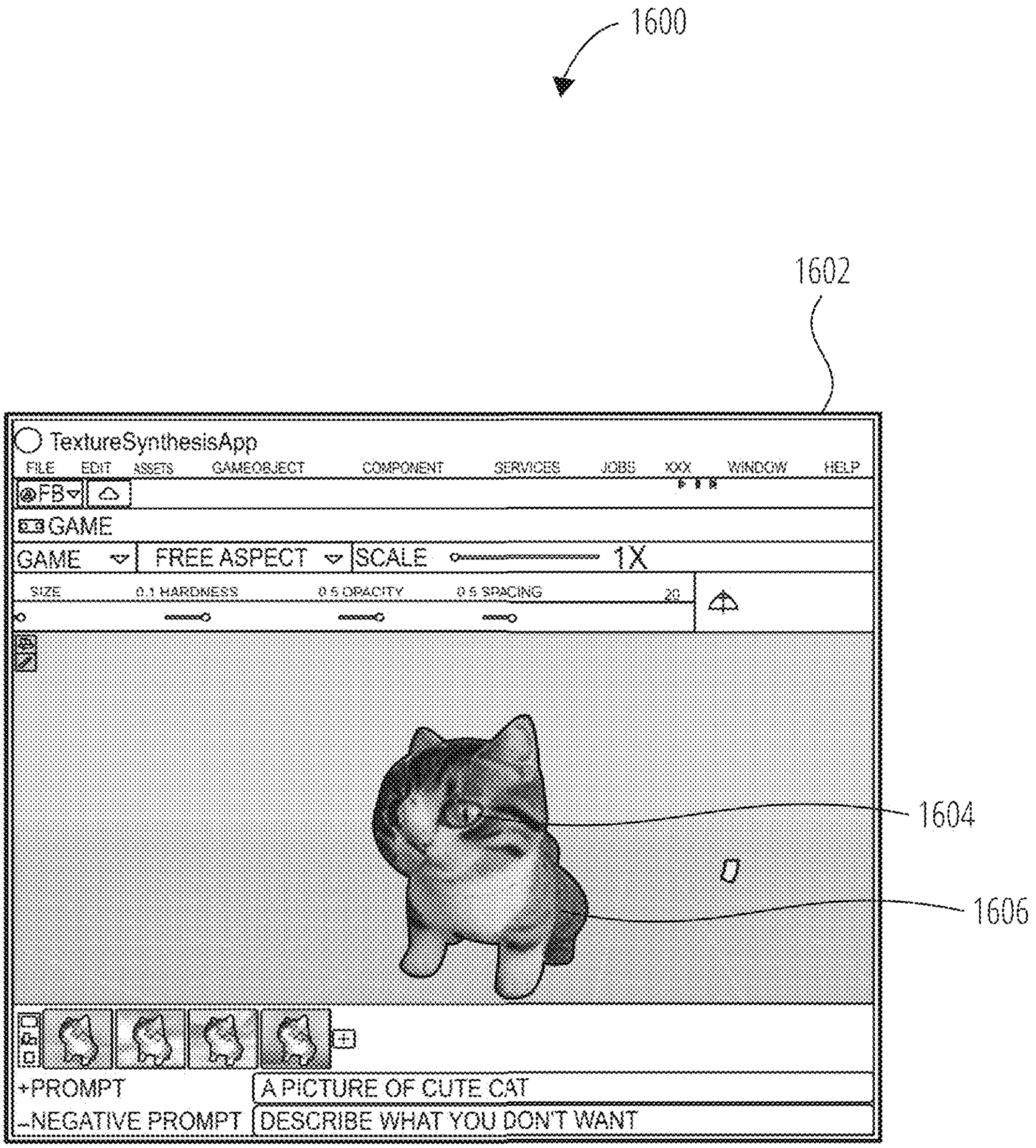
FIG. 16 is an illustration of a UI screen for a texture generation system, according to some examples.

FIG. 15 and FIG. 16 highlight user interaction capabilities, demonstrating how the system is enabled to process user input that directly influences texture attributes used during the texture generation process.

Figure 17:
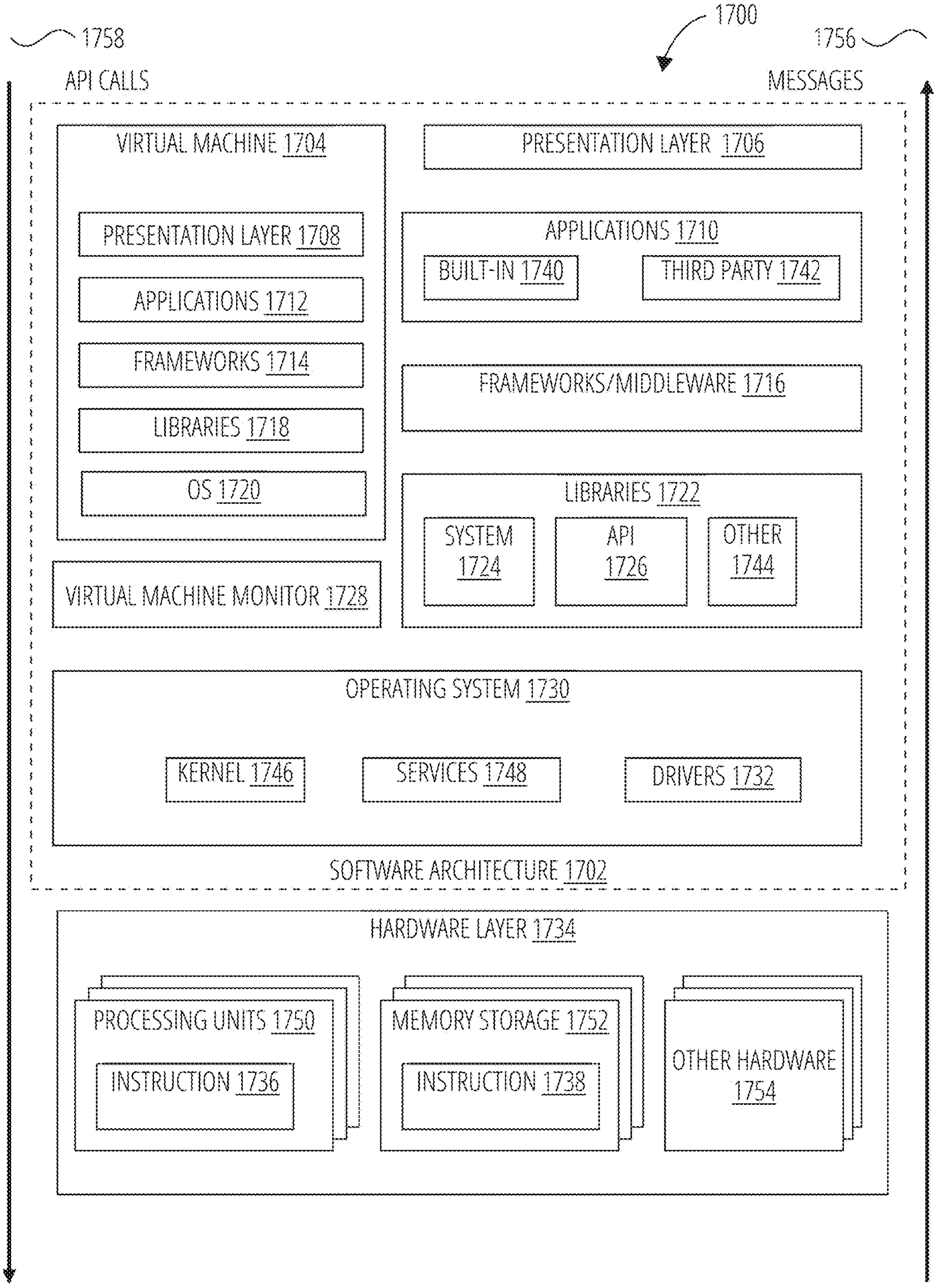
FIG. 17 is a block diagram illustrating an example of a software architecture that may be installed on a machine, according to some examples.

FIG. 17 illustrates the software architecture of the system, detailing the layers and components involved.

Figure 18:
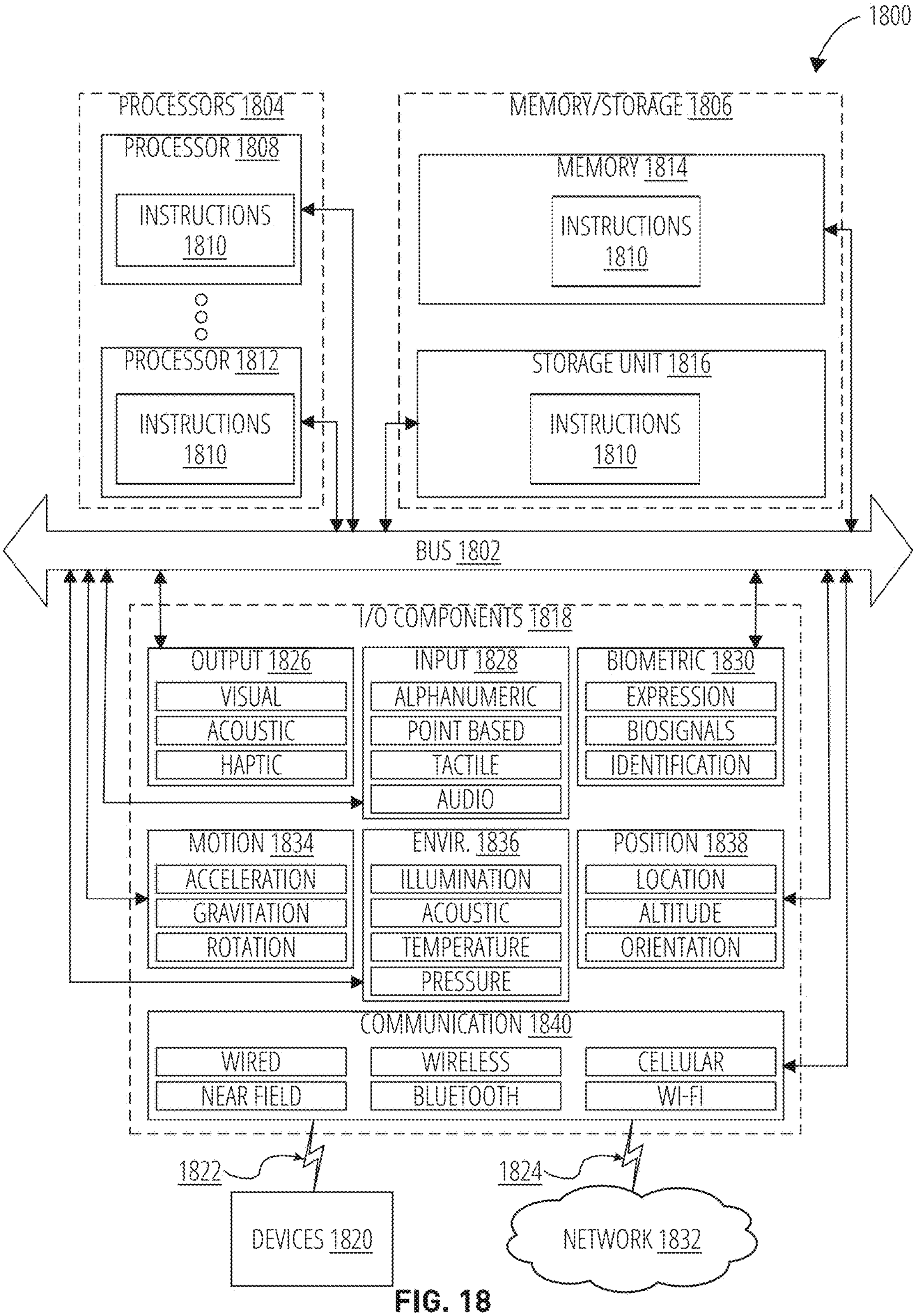
FIG. 18 is a block diagram illustrating components of a machine, according to some examples, able to read instructions from a machine-readable medium (e.g., a machine-readable storage medium) and perform any one or more of the methodologies discussed herein.

FIG. 18 shows the hardware components of a machine capable of executing the texture generation system.

Figure 19:
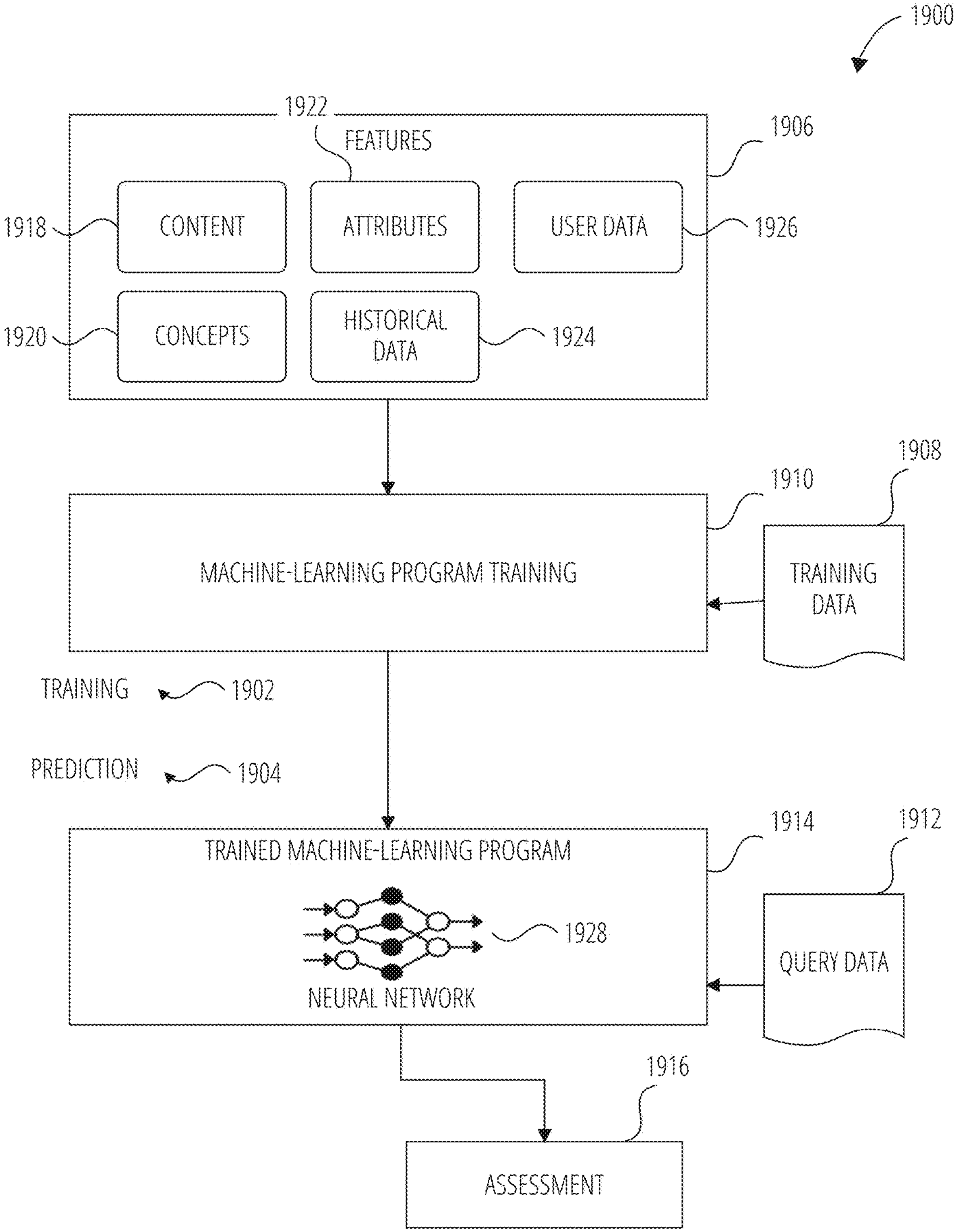
FIG. 19 is a block diagram illustrating a machine learning program, according to some examples.

FIG. 19 describes a machine-learning program that can be used in the texture generation system.

FIG. 1 is a network diagram depicting a system 100 within which various example embodiments described herein may be deployed. A networked system 122 in the example form of a cloud computing service, such as Microsoft Azure or other cloud service, provides server-side functionality, via a network 118 (e.g., the Internet or Wide Area Network (WAN)) to one or more endpoints (e.g., client machine(s) 108). FIG. 1 illustrates client application(s) 110 on the client machine(s) 108. Examples of client application(s) 110 may include a web browser application, such as the Internet Explorer browser developed by Microsoft Corporation of Redmond, Washington or other applications supported by an operating system of the device, such as applications supported by Windows, iOS or Android operating systems. Examples of such applications include e-mail client applications executing natively on the device, such as an Apple Mail client application executing on an iOS device, a Microsoft Outlook client application executing on a Microsoft Windows device, or a Gmail client application executing on an Android device. Examples of other such applications may include calendar applications, file sharing applications, contact center applications, digital content creation applications (e.g., game development applications) or game applications. Each of the client application(s) 110 may include a software application module (e.g., a plug-in, add-in, or macro) that adds a specific service or feature to the application.

An API server 120 and a web server 126 are coupled to, and provide programmatic and web interfaces respectively to, one or more software services, which may be hosted on a software-as-a-service (SaaS) layer or platform 102. The SaaS platform may be part of a service-oriented architecture, being stacked upon a platform-as-a-service (PaaS) layer 104 which, may be, in turn, stacked upon an infrastructure-as-a-service (IaaS) layer 106 (e.g., in accordance with standards defined by the National Institute of Standards and Technology (NIST)).

While the applications (e.g., service(s)) 112 are shown in FIG. 1 to form part of the networked system 122, in alternative embodiments, the applications 112 may form part of a service that is separate and distinct from the networked system 122.

Further, while the system 100 shown in FIG. 1 employs a cloud-based architecture, various embodiments are, of course, not limited to such an architecture, and could equally well find application in a client-server, distributed, or peer-to-peer system, for example. The various server services or applications 112 could also be implemented as standalone software programs. Additionally, although FIG. 1 depicts machine(s) 108 as being coupled to a single networked system 122, it will be readily apparent to one skilled in the art that client machine(s) 108, as well as client application(s) 110 (such as game applications), may be coupled to multiple networked systems, such as payment applications associated with multiple payment processors or acquiring banks (e.g., PayPal, Visa, MasterCard, and American Express).

Web applications executing on the client machine(s) 108 may access the various applications 112 via the web interface supported by the web server 126. Similarly, native applications executing on the client machine(s) 108 may access the various services and functions provided by the applications 112 via the programmatic interface provided by the API server 120. For example, the third-party applications may, utilizing information retrieved from the networked system 122, support one or more features or functions on a website hosted by the third party. The third-party website may, for example, provide one or more promotional, marketplace or payment functions that are integrated into or supported by relevant applications of the networked system 122.

The server applications may be hosted on dedicated or shared server machines (not shown) that are communicatively coupled to enable communications between server machines. The server applications 112 themselves are communicatively coupled (e.g., via appropriate interfaces) to each other and to various data sources, so as to allow information to be passed between the server applications 112 and so as to allow the server applications 112 to share and access common data. The server applications 112 may furthermore access one or more databases 124 via the database server(s) 114. In example embodiments, various data items are stored in the databases 124, such as the system's data items 128. In example embodiments, the system's data items may be any of the data items described herein.

Navigation of the networked system 122 may be facilitated by one or more navigation applications. For example, a search application (as an example of a navigation application) may enable keyword searches of data items included in the one or more databases 124 associated with the networked system 122. A client application may allow users to access the system's data 128 (e.g., via one or more client applications). Various other navigation applications may be provided to supplement the search and browsing applications.

FIG. 2 is a diagrammatic representation of a texture generation system 208, according to some examples. Texture generation system 208 includes image generation module 202, UV projection module 204, pixel quality module 210, and/or other potential components. The image generation module 202 includes a refine mask module 206. Examples in the disclosure herein refer to additional components of texture generation system 208. For example, the UV projection module 204 can include a mask generation module, and so forth. In some examples, FIG. 2 components and/or modules can have a different configuration: for example, pixel quality module 210 can share functions with the UV projection module 204 or the image generation module 202, and so on.

Given an object (e.g., a 3D mesh) and/or a UV unwrapping corresponding to the object, the texture generation system 208 generates a texture image that, when applied to the object (e.g., the 3D mesh), gives it its final appearance while preserving the constraints reflected by the UV unwrapping of the object. The texture generation system 208 can construct a final texture in an iterative and/or interactive fashion, eliciting and/or receiving user input at one or more steps of the texture generation process. Examples of module functionality for the components and modules of texture generation system 208 are illustrated in the context of FIG. 3.

Figure 3:
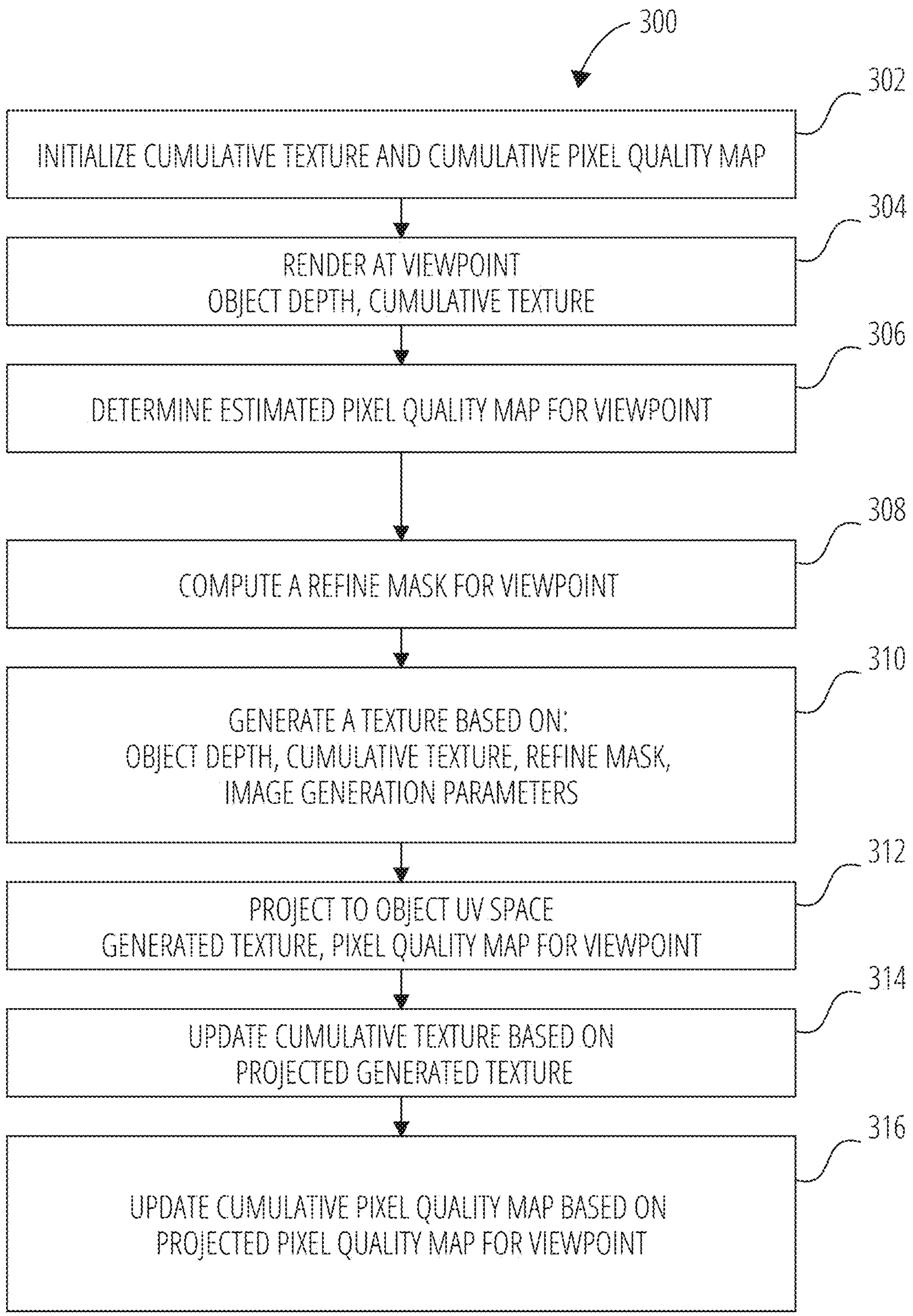
FIG. 3 is a flowchart illustrating a texture generation method, according to some examples.

FIG. 3 is an illustration of a texture generation method 300, according to some examples, as implemented by a texture generation system 208. In some examples, the texture generation system 208 proceeds in an iterative fashion, starting with an object (e.g., a 3D mesh). The texture generation system 208 can take as input an UV unwrapping or projection of the target object, corresponding for example to a 2D, flattened version of the target object (e.g., a flattened version of the 3D mesh). The unwrapping of the target object is provided as input to the texture generation system 208 via a file, as the output of an external API or an additional system component, and so forth. The texture generation system 208 generates a texture corresponding to an image used to provide information about the appearance of the object. For example, a diffuse texture including pixels with corresponding RBG values can provide information about the raw color of each point of the surface of the object.

The texture generation system 208 initializes, at operation 302, a cumulative texture and/or an associated cumulative pixel quality map. The cumulative texture corresponds to a current appearance of the object at a given iteration of a number of iterations, with each iteration corresponding to a new viewpoint. The cumulative texture accumulates texture data over the iterations, by fusing together generated (or synthesized) texture images from multiple viewpoints. In some examples, the cumulative texture follows a UV mapping, corresponding for example to a projection of the object in the UV space (e.g., a UV unwrapping), to define which part of the object (e.g., 3D mesh) corresponds to which color.

In some examples, the cumulative pixel quality map, containing single float values, indicates a quality of the cumulative texture. A pixel quality map associated with a texture can include pixel quality values between 0 and 1 (inclusive). A pixel quality value of 0 corresponds to a pixel that was not yet generated, a value of 1 to a pixel that was generated as part of the texture with the highest possible quality, and the remaining values correspond to pixels generated with varying quality. In some examples, pixel quality values can vary between values other than 0 and 1 without departing from the scope of the disclosure. In some examples, the cumulative pixel quality map corresponds to a pixel quality map accumulated over iterations corresponding to differing viewpoints. The texture generation system 208 fuses together, in UV space, estimated pixel quality map(s) for all such individual viewpoints to compute the cumulative pixel quality map. In some examples, this process uses a method similar to the fusing of generated (or synthesized) texture images from multiple viewpoints (see, e.g., FIG. 14).

As indicated above, the cumulative texture and the cumulative pixel quality map are initialized at operation 302. The cumulative texture can be initialized with black color pixels (e.g., in the absence of any prior pixel generation). The cumulative pixel quality map can be initialized with all 0 values (e.g., in the absence of any prior pixel generation). In some examples, the texture generation system 208 sets a texture resolution for the cumulative texture, based for example on elicited user input. The texture resolution is given by a width and height for the target texture image for the corresponding object, where the width and height can be the same or not (e.g., 512×512 pixels, 1024×1024 pixels, 2048×2048 pixels, 4096×4096 pixels, and so forth). In some examples, the object already has a texture, with the cumulative texture corresponding to the initial texture, the cumulative pixel quality map corresponding to an initial pixel quality map, and/or the texture resolution corresponding to the texture resolution of the original texture. In some examples, the texture resolution corresponds to the desired resolution for the target, final cumulative texture image and does not change throughout the generative texture process.

At a new iteration, the texture generation system 208 moves the camera to a new viewpoint. In some examples, the new viewpoint selection is received from a user, while in others, the new viewpoint can be automatically selected. For example, a set of viewpoints of a pre-determined size can be automatically selected, allowing for example for the camera to move around the object. At operation 304, the texture generation system 208 renders, from the new viewpoint, an object depth, the rendering taking place in view space (e.g., camera view space, natural space, or render space). In some examples, object depth data or an object depth map corresponds to a set of floats (e.g., with full floating point precision to avoid any quantization artifacts). In some examples, the object depth is based on using a camera projection matrix for non-orthographic cameras. In some examples, the object depth is based on the distance between a rendered fragment and the camera position for orthographic cameras. At operation 304, the texture generation system 208 also renders, from the new viewpoint, the cumulative texture of the object (the operation taking place in view space).

At operation 306, the texture generation system 208 determines an estimated pixel quality map corresponding to the new viewpoint. The estimated pixel quality map is represented by a set of float values. The estimated pixel quality map indicates an estimated quality of a new texture image as rendered from the new viewpoint—that is, it corresponds to the pixel quality map that the new viewpoint would have. For example, if the texture generation system 208 moves the viewpoint from a front of the object to a side of the object, the estimated pixel quality map reflects a quality of a new texture image to be rendered from the side viewpoint. In some examples, the cumulative pixel quality map and/or the estimated pixel quality map are computed by the pixel quality module 210. For more details about the computation of the estimated pixel quality map, see FIG. 4. Note that as detailed in FIG. 4, the estimated pixel quality map can be computed ahead of the generation of the new texture image, and as detailed below, can inform the generation of the new texture image.

At operation 308, the texture generation system 208 computes a refine mask for use, in view space, by an image generation method or system (or an image synthesis method or system). In some examples, the refine mask module 206 computes the refine map based on comparing the cumulative pixel quality map and the estimated pixel quality map (sec, e.g., FIG. 12 for an example). The refine mask guides the generation of the new texture image, rendered from the new viewpoint, given the current version of the cumulative texture rendered from the new viewpoint. The refine mask indicates how close, or how different, parts of the new texture should be to the current version of the cumulative texture. This guidance corresponds to how much a surface part of the object (e.g., the 3 D mesh) as seen from the new viewpoint must be refined, replaced or kept when a new texture image is synthesized or generated from the new viewpoint. In some examples, the refine mask can be a binary mask, encoding only 0 and/or 1 values (or equivalent) that indicate pixels that should be kept or generated as part of the new viewpoint-based texture generation. In some examples, the refine mask is a continuous mask. The refine mask can contain values between 0 and 1 (inclusive). A value of 1 indicates that a part of the cumulative texture image should be kept, 0 indicates it should be fully generated, and/or an intermediate value indicates it should be refined.

Example: Refine Mask Computation

The values in the refine mask are computed as described in the following. For a given pixel, a pixel quality of 0 (lowest) in the cumulative pixel quality map corresponds to the pixel not having been seen or generated for any of the previous viewpoints. The corresponding refine mask value for such as a pixel is 1 (or white), indicating that the pixel should be generated. If the pixel quality value in the cumulative pixel quality map is greater or equal to the corresponding quality value in the estimated pixel quality map (e.g., the new pixel quality map), the results of the accumulated previous generations should be preserved. Therefore, the corresponding refine mask value for the respective pixel is 0 (or black). If the pixel quality value in the cumulative pixel quality map is smaller than the corresponding quality value in the estimated pixel quality map (e.g., the new pixel quality map), the corresponding area is now seen from a better angle, or from a closer distance. Thus, the respective portion (e.g., pixel) of the cumulative texture should be refined to reflect this more favorable viewpoint. This guidance is encoded by a refine mask value between 0 and 1. In some examples, computing such a refine mask value uses a linear blending curve, and/or other value computation procedures.

At operation 310, the texture generation system 208, for example via the image generation module 202, generates a new texture image corresponding to the new viewpoint. The image generation module 202 uses an image generation or image synthesis method and/or the rendered object depth, the current version of the cumulative texture rendered from the new viewpoint, the refine mask, and/or one or more image generation parameters. The image generation method outputs a new texture image, based on the guidance provided by the refine mask. By taking into account the accumulated output of previous texture image iterations (e.g., the cumulative texture), and by using the refine mask, the image generation module 202 ensures that the iteratively generated texture image for the object is not patchy and/or does not exhibit severe color or texture discontinuities. In some examples, the image generation module 202 can use image generation methods such as diffusion methods (e.g., as implemented by Stable Diffusion family of models, GLIDE, Imagen family, DALL-E family, Temporal Diffusion Models (TDMs), Cross-Attention Transformer Models, Hybrid Diffusion-Transformer Models, Energy-Based Diffusion Models (EBMs), Multi-Scale Diffusion Models, Inverse Diffusion Models, etc.), GAN-based methods, such as methods based on VQGAN+CLIP, XMC-GAN), and so forth. In some examples, the image generation module 202 provides additional parameters or inputs to the image generation method, such as a text prompt (in the case of text-to-image generation methods), the number of steps (corresponding to the internal number of iterations for the method), and so forth. In some examples, image generation systems such as ControlNet allow the image generation process to be further guided by input from modalities other than text, such as depth. In some examples, the image generation method can take as input a non-binary refine mask. In some examples, an already existent method (e.g., a diffusion method implemented by a Stable Diffusion model) that uses binary masks (e.g., for inpainting purposes) can be augmented to use a non-binary refine mask. FIG. 13 illustrates aspects of such a method.

At operation 312, the texture generation system projects, for example via the UV projection module 204, the newly generated texture image from the view space to the object UV space (e.g., the 3D mesh UV space). The UV projection module 204 projects the estimated pixel quality map corresponding to the new viewpoint to the object UV space. The projection or mapping from the view space to the object UV space can be executed using one or more techniques (e.g., an angle-based method, Least Squares Conformal Mapping (LSCM), and so forth). FIG. 11 illustrates aspects of an example projection method.

At operation 314, the cumulative texture image is updated, in the UV space, using the projected newly generated image. In some examples, the projection to UV space takes into account occlusion or culling information (e.g., hidden fragments) (see, e.g., FIG. 11 for details). Subsequent to the update, the cumulative texture image incorporates the output of the most recent image generation step.

At operation 316, the cumulative pixel quality map is updated, in the UV space, based on its previous value, the projected pixel quality map from the new viewpoint (e.g., the projected estimated pixel quality map for the new viewpoint), occlusions or culling information (e.g., hidden fragments), and so forth.

Once the cumulative texture image and/or cumulative pixel quality map are updated, the texture generation system 208 proceeds to the next iteration, corresponding to an additional viewpoint. As previously indicated, new viewpoints can be selected automatically, for example based on an automatically determined incremental change in angle, position and/or orientation of the camera. In some examples, the texture generation system 208 automatically iterates as described above until a termination condition is reached. An example termination condition can be indicated by a set of automatically determined quality indicators for the most recent version of the cumulative texture image and/or the most recent version of the cumulative pixel quality map. For example, termination could be based on factors such as texture smoothness and/or cross-viewpoint consistency (among other factors). Texture smoothness could be given by a standard deviation of pixel intensity values across the texture, cross-viewpoint consistency could measure the variance in texture-related metrics (such as texture smoothness, etc) across viewpoints, and so forth. Termination condition (s) can include one or more of the above metrics transgressing pre-determined thresholds, or converging to a value, and so forth.

To allow for greater flexibility and alignment with user intent, the texture generation system 208 can enable and/or elicit user input. The user can pick the new viewpoint to be used for generation, and/or can provide or modify defaults for rendering parameters. The user can edit any parameter of the used image generation method such as the text prompt, diffusion parameters, and so on. The user can generate multiple new texture image variants for each individual viewpoint before picking the best one for the next step. Furthermore, the user can re-generate specific parts of the texture image, optionally providing color input or other supported modality or image characteristic, to guide the image generation toward a specific outcome (see FIG. 15 for more details).

Figure 4:
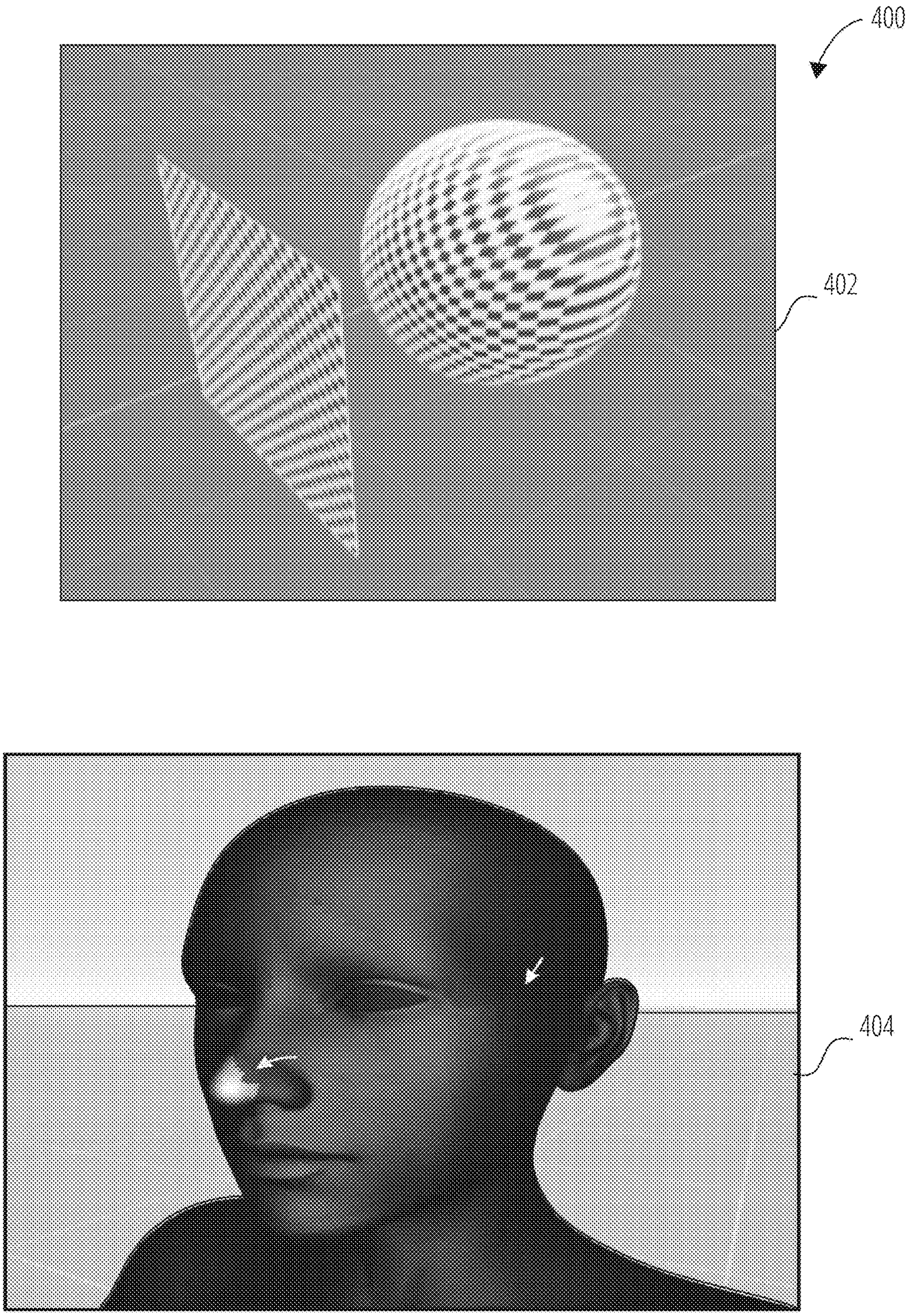
FIG. 4 is an illustration of pixel quality considerations, according to some examples.

FIG. 4 is an illustration of pixel quality considerations for generated pixels, according to some examples. For example, if an object (e.g., a mesh) faces the camera, the generated image will be well aligned with the mesh so that when projected to the mesh, it will have almost no distortion. If the mesh is almost perpendicular to the camera, a single pixel of the generated image will cover a large area of the mesh, resulting in poor quality and stretching artifacts. Image 402 illustrates these distinctions for a checkerboard (on the left in 402) projected onto a sphere. Areas facing the projection direction exhibit little stretching while side areas exhibit significant stretching (see, e.g., stretching artifacts on the sphere's surface).

In some examples, different object parts (e.g., parts of a mesh) correspond to different texture areas, as defined per the UV mapping. Thus different object parts will use the target, cumulative texture resolution differently. For instance, given a character's head, the UV regions of the character's face could cover most of the texture space, while only a small part of the texture space is used for a nose. Therefore, even if a nose point is seen from the exact same viewpoint as an car point, their pixel quality would differ because they exploit the available texture resolution differently. Image 404 shows an example of a pixel quality map for a particular viewpoint (e.g., the viewpoint from which the face is being viewed in the illustration). White corresponds to a high pixel quality (e.g., quality of 1), black corresponds to a low pixel quality, with shades of gray corresponding to intermediate quality values. The illustration showcases how artistic choices impact the pixel quality. For example, if the UV map for the head supplied by an artist has a small UV area dedicated to the nose, and a synthesized texture image is generated for a viewpoint that is close to the nose and with a favorable orientation, the pixel quality for the tip of the nose will be higher than that of other regions of the face.

Figure 5:
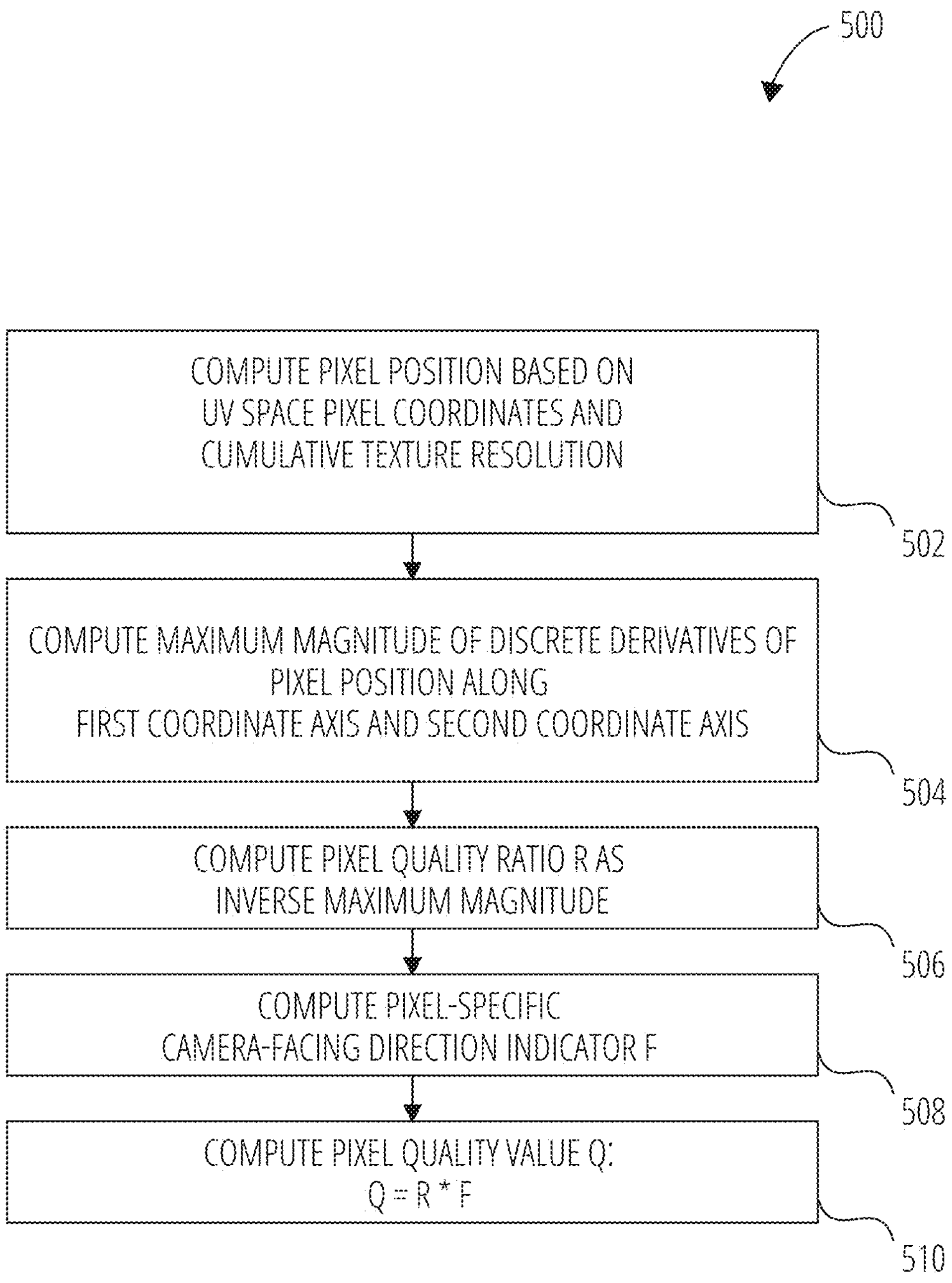
FIG. 5 is a flowchart illustrating a method for computing a pixel quality value, according to some examples.

FIG. 5 is a flowchart illustrating a method 500 for computing a pixel quality map, according to some examples, as implemented by the pixel quality module 210 of the texture generation system 208. In some examples, the pixel quality map is the estimated pixel quality map corresponding to a given viewpoint. An estimated pixel quality map contains pixel quality values associated with a generated or synthesized texture image associated with the given viewpoint.

In some examples, a pixel quality for an object fragment (e.g., a mesh fragment) is a function of a pixel quality ratio for the object fragment and/or the effect of camera direction, as detailed further below. The pixel quality ratio is defined as the inverse ratio between a function of the number of pixels the object fragment corresponds to in a target texture (e.g., the cumulative texture) and a function of the number of pixels the object fragment corresponds to in the synthesized texture image, where the inverse ratio is bounded by 1 due to a hard constraint provided by the texture resolution on how many pixels could be in the texture (e.g., a fixed cumulative texture resolution set as described in FIG. 3). In some examples, the function of the number of pixels can be the width and/or height of an area. In some examples, the computation of the pixel quality ratios is adjusted to deal with the effect of camera direction. In an example, if one synthesized pixel projected from the new viewpoint covers exactly one pixel of the target texture (e.g., the cumulative texture), the corresponding pixel quality ratio is equal to 1. If one synthesized pixel projected from the new viewpoint covers a 4×4 pixel area of the target texture, the corresponding pixel quality ratio for is ¼, i.e., 0.25. This 0.25 value indicates that the resolution of the target texture (e.g., the cumulative texture) could be used further—for example, the texture generation system 208 can generate or synthesize a closer view of the object. An example of such a scenario is the object being a simple plane, and the camera view perfectly framing that plane facing the camera. In this case, projecting the synthesized image onto the plane can lead to one pixel of the synthesized image covering a 4×4 pixels area for the target texture, with the target texture resolution not being fully used. An example of the target texture resolution being fully used is the camera being located on a portion of the plane, and each single pixel of the synthesized image exactly matching a single pixel of the target texture.

Example: Computing Estimated Pixel Quality Maps

In some examples, the estimated pixel quality map corresponding to a new viewpoint is computed based on one or more of: a) information about the orientation and/or position of the new viewpoint for the generated or synthesized texture image (e.g., the facing direction of a corresponding object or mesh point with respect to the camera when a corresponding pixel was generated); b) the resolution of the cumulative texture; c) the resolution of the generated and/or synthesized texture; d) the UV mapping (e.g., the object-associated mapping and/or projection from the synthesized view space to the UV space or cumulative texture space). As noted above, pixel quality depends on the number of texture pixels (e.g., pixels in the UV space corresponding to the cumulative texture) covered by a single synthesized or generated pixel projected from the new viewpoint covers. In some examples, the cumulative texture (e.g., a Diffuse texture) and the synthesized texture image have different resolutions (e.g., 2048 pixels for the former, 1912 pixels for the latter). In some examples, the pixel quality module 210 uses a version of a mipmap-level technique adjusted for the case of texture generation or synthesis.

In some examples, the pixel quality module 210 implements pixel quality computations using shaders. For example, the pixel quality computations can leverage the partial derivative capabilities of modern rendering (e.g., ddx and ddy), to compute how the UV coordinates evolve locally for a specific rendered pixel. Such partial derivative capabilities in the context of rendering can already take into account the camera viewpoint. Shaders can compute derivatives of certain operations, such as the UV mapping operation that maps the view space to the object UV space (e.g., the cumulative texture space). The magnitude of the derivative of the UV mapping operation is directly linked to the pixel quality value.

Example: Pixel Quality Values

In some examples, pixel quality values are computed as described in the following. Pixel quality values in the estimated pixel quality map can be initialized to 0. Furthermore, the pixel quality module 210 computes pixel quality Q as a function of a pixel quality ratio R and a camera-facing indicator F, as seen below.

Pixel Quality Ratio At operation 502, the pixel quality module 210 retrieves the UV coordinates UVx and UVy for a pixel to be rendered from the new viewpoint. The UV coordinates are normalized between 0 and 1 along the X and Y dimensions. The UV coordinates are coordinates in the object UV space (e.g., the cumulative texture space). The pixel quality module 210 computes the pixel position P=(Px, Py) in the UV space based on the normalized UV coordinates UVx and UVy and/or textureResolution, the resolution of the cumulative texture:

$$P=(Px,Py)=(\text{textureResolution}*\text{UV}x,\ \text{textureResolution}*\text{UV}y)$$

At operation 504, the pixel quality module 210 computes D, the maximum magnitude of the discrete derivatives of the pixel position along axis DX and axis DY:

$$D=\text{Max}(\text{Norm}(DDX(P)),\text{Norm}(DDY(P))),\ \text{where:}$$

DDX( ) and DDY( ) are discrete derivative operators, for example provided by shaders, corresponding to the X dimension and, respectively, the Y dimension. DDX( ) and DDY( ) return vectors whose values are normalized (see below)

Max( ) is a function returning the maximum value of a tuple of values; Norm( ) is a function returning the magnitude of a vector.

At operation 506, the pixel quality module 210 computes the final pixel quality ratio value R as:

$$R=\text{Clamp}_{01}(1/D),\ \text{where}$$

$\text{Clamp}_{01}$ clamps the inverse maximum magnitude value between 0 and 1.

Camera-Facing Indicator F corresponds to a camera-facing indicator or viewpoint-facing indicator for the degree to which a pixel is facing the current camera viewpoint (e.g., corresponding to the position and/or orientation with respect to the camera viewpoint of a corresponding object point or mesh point whose associated pixel is to be generated). At operation 508, the pixel quality module 210 computes F as an indicator of whether the pixel is facing the camera and/or viewpoint (e.g., F=1), the pixel is perpendicular to it (e.g., F=0, see below for details), or F corresponds to any other possible rotation with respect to the camera (e.g., F takes values between 0 and 1—exclusive):

$$F=\text{Clamp}_{01}|\text{NormalPixel}*\text{CameraDirection}|,$$

where NormalPixel is the normal vector of the surface of the object at the pixel being rendered, CameraDirection is the facing vector of the camera (e.g., the direction in which the camera is looking), and F corresponds to the dot product of the two vectors, whose value is clamped to the [0, 1] range.

At operation 510, the pixel quality module 210 computes the pixel quality value Q as a function of R and F, for example: Q=R*F. For example, pixels corresponding to points that are perpendicular to the camera have a pixel quality value Q of 0, while pixels that are facing the camera have a pixel quality value of R. Examples of estimated pixel quality maps for differing viewpoints can be seen at least in images 608, 908, 1008 and so forth.

Figure 6:
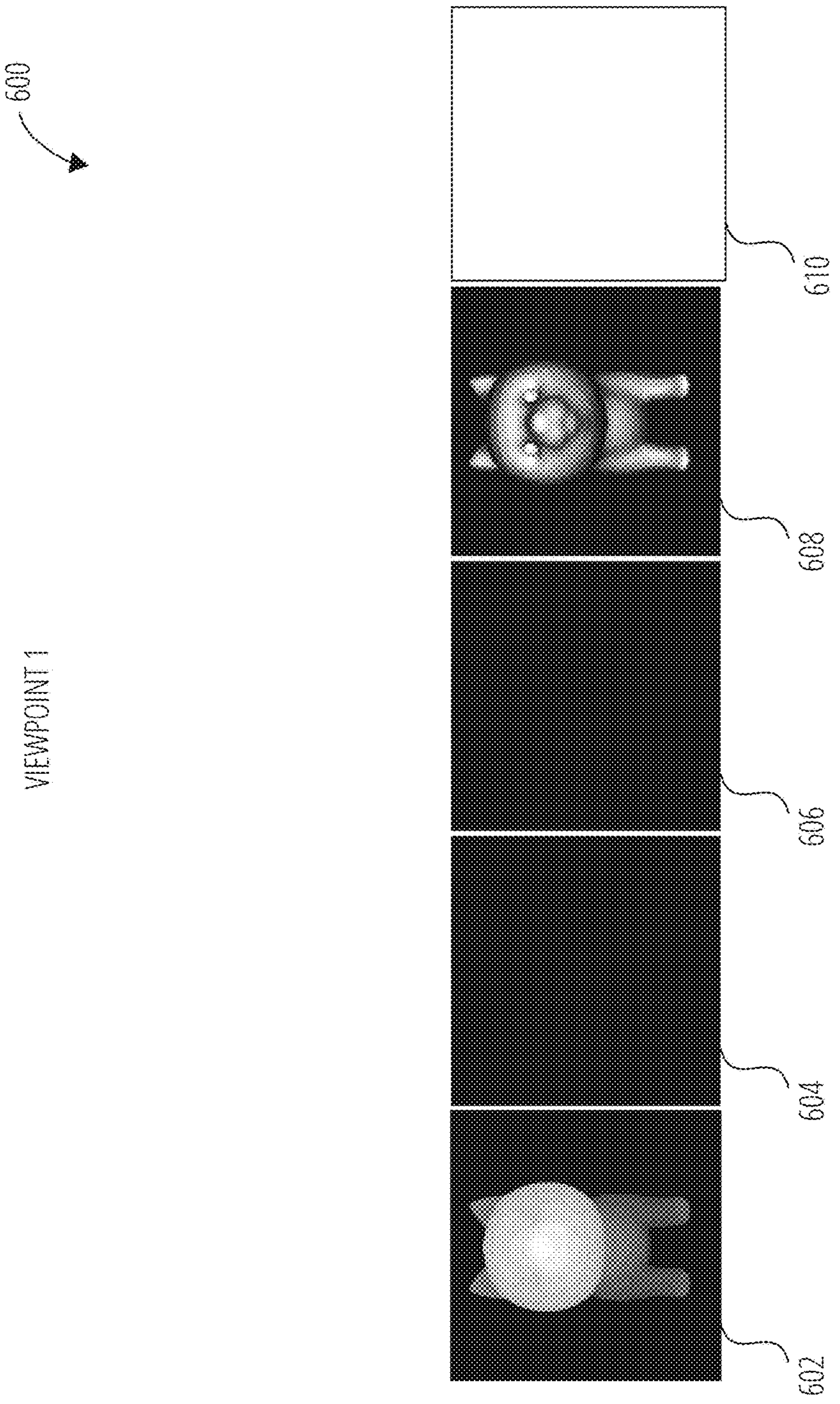
FIG. 6 is an illustration of aspects of a texture generation method, according to some examples.
Figure 7:
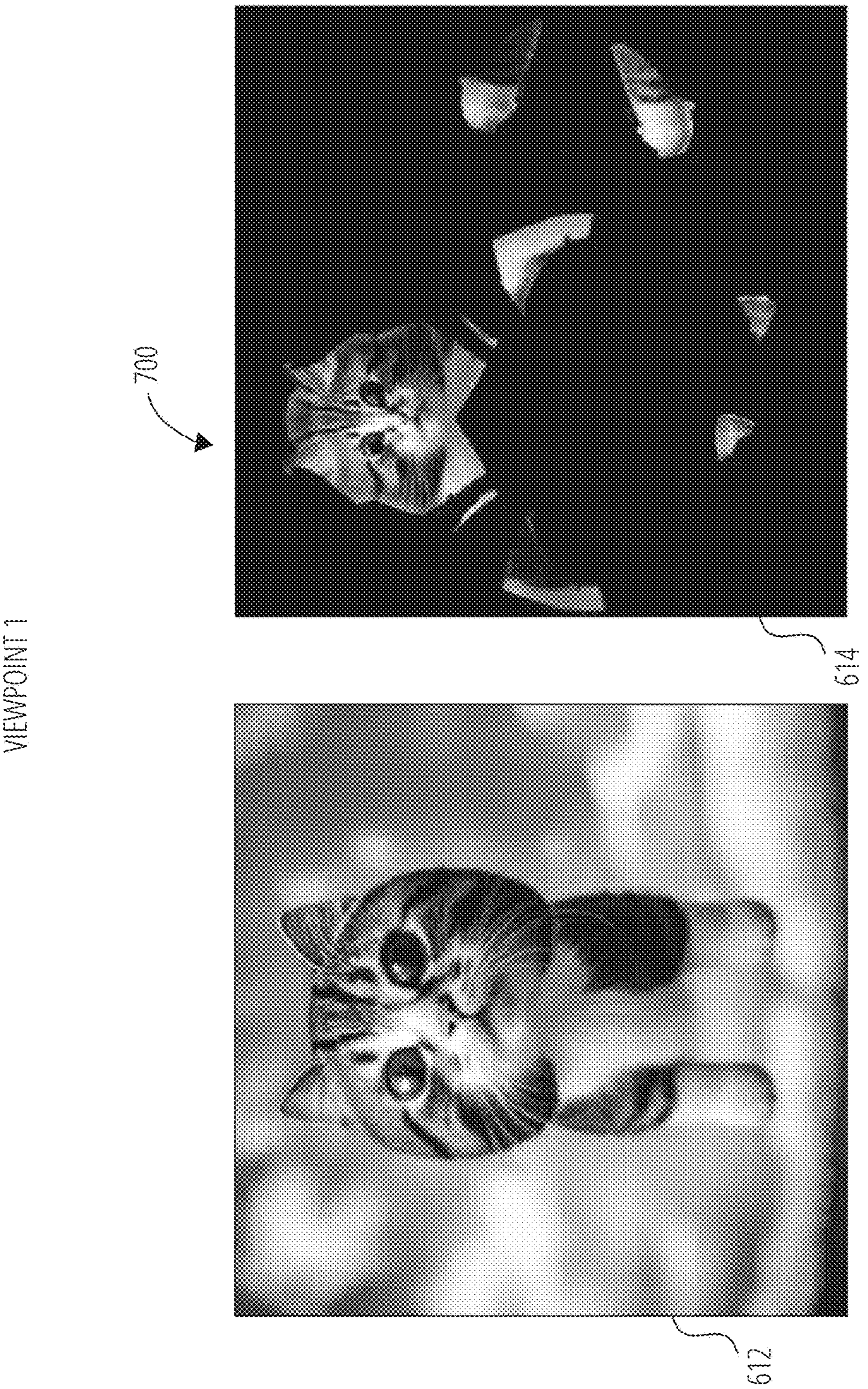
FIG. 7 is an illustration of aspects of a texture generation method, according to some examples.
Figure 8:
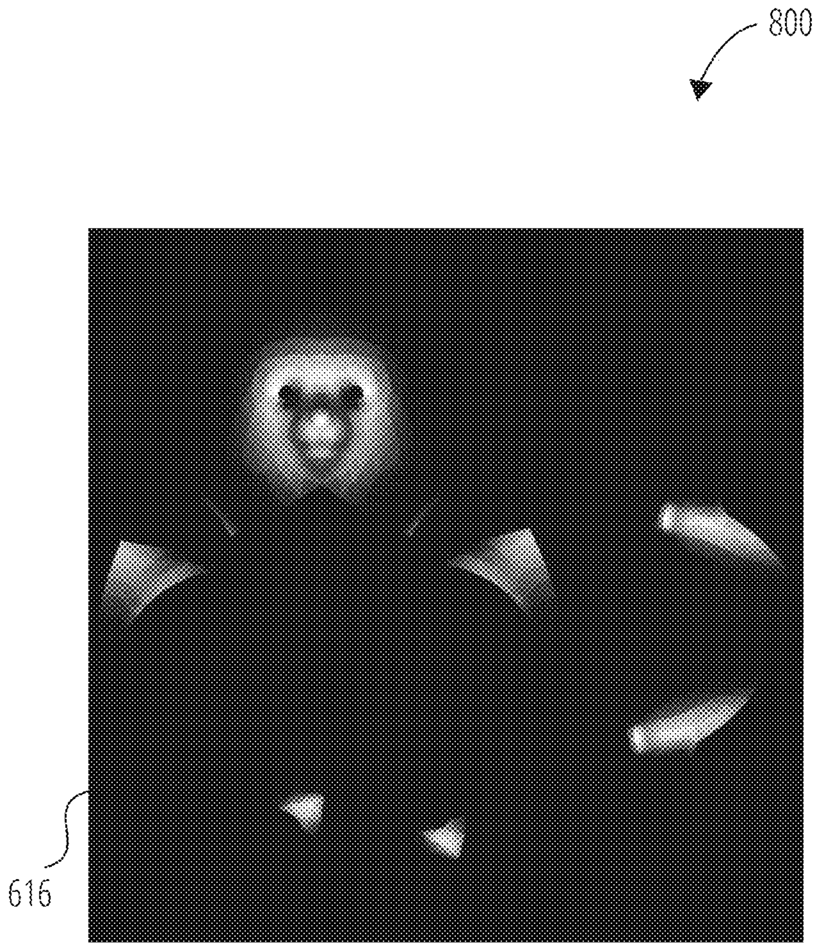
FIG. 8 is an illustration of aspects of a texture generation method, according to some examples.
Figure 9:
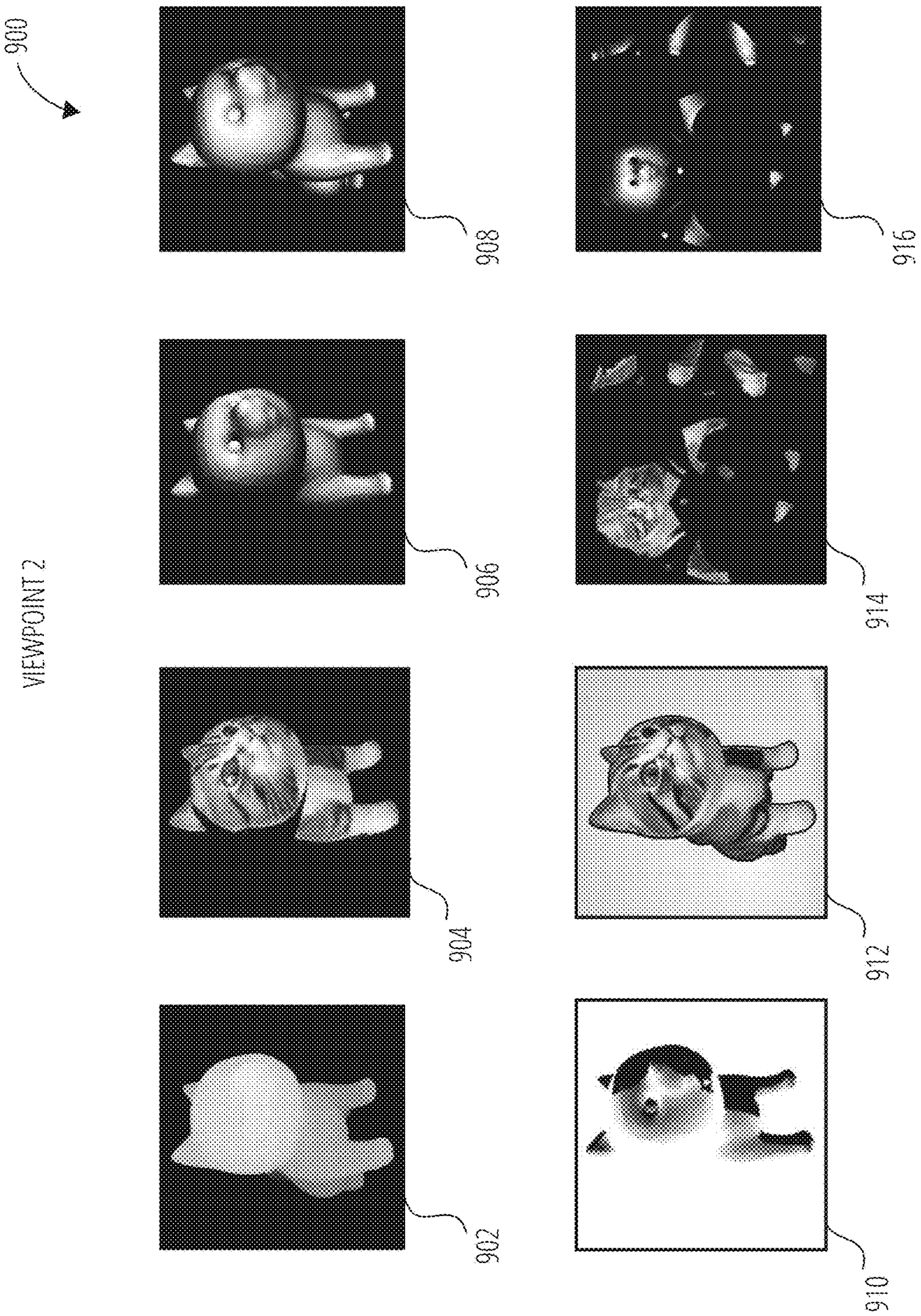
FIG. 9 is an illustration of aspects of a texture generation method, according to some examples.
Figure 10:
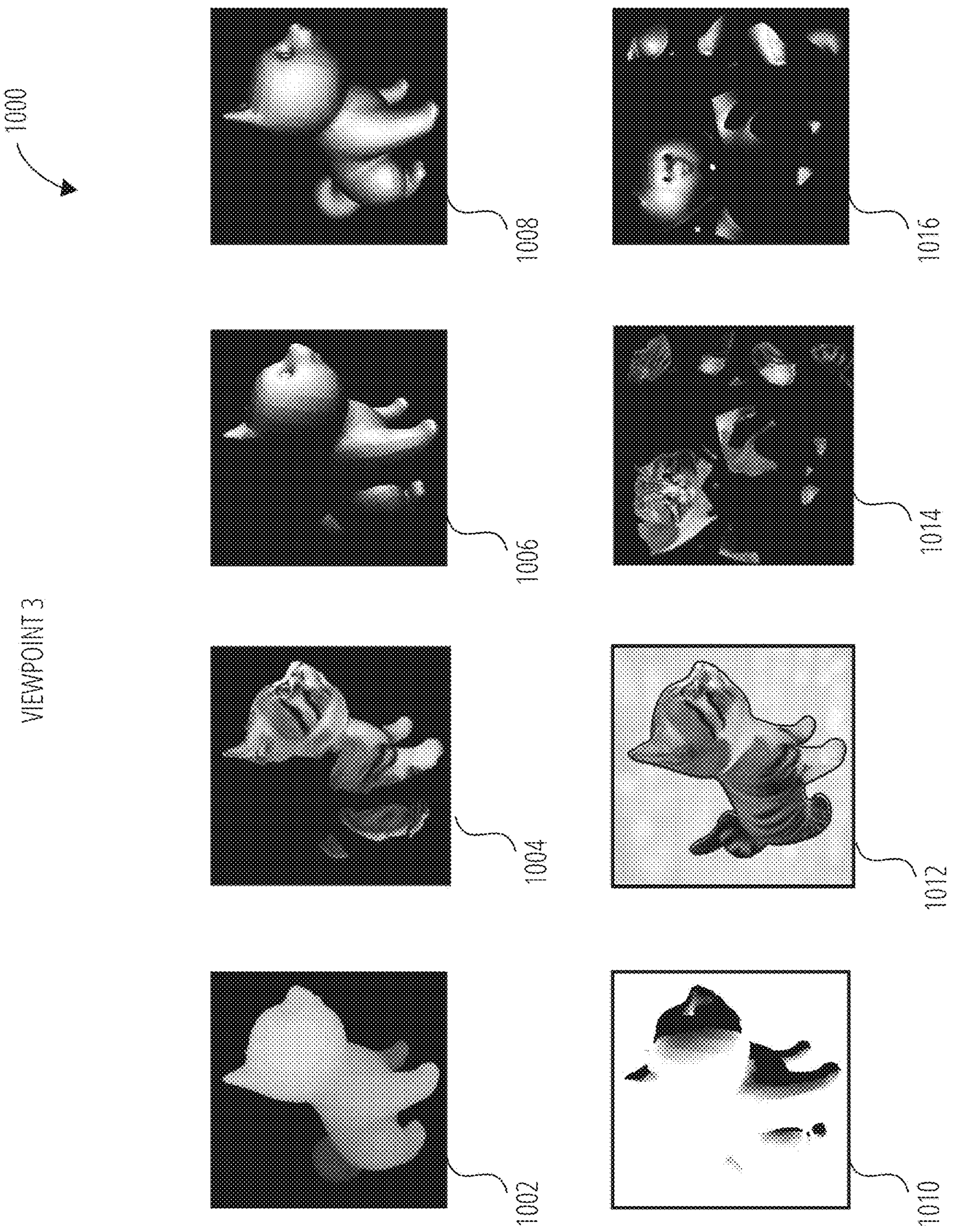
FIG. 10 is an illustration of aspects of a texture generation method, according to some examples.

FIG. 6, FIG. 7 and FIG. 8 correspond to illustrations 600, 700 and 800 of aspects of texture generation method 300, according to some examples, as implemented by a texture generation system 208. Viewpoint 1 corresponds to a viewpoint being used in the first iteration of a run by texture generation system 208. The images in FIG. 6, FIG. 7 and FIG. 8 collectively correspond to aspects and/or intermediate outputs produced by texture generation system 208 during the first iteration of the run. FIG. 9 and FIG. 10 illustrate aspects of further iterations of the texture generation system 208 run, corresponding to two successive new viewpoints.

Image 602 corresponds to an object depth map corresponding to viewpoint 1. Here, viewpoint 1 is a front view with respect to the object. The object depth can be provided to the system as a map corresponding to a set of floats, with full floating point precision to avoid quantization losses. Each value in the map represents the distance of a point (e.g., a mesh point) to the camera.

Image 604 corresponds to a rendering of a cumulative texture representing the object texture generated so far. Here, the cumulative texture is empty (e.g., corresponding to a black color), given that the texture generation system is the beginning of the iterative generation process.

Image 606 corresponds to a cumulative pixel quality map associated with the cumulative texture generated so far. Here, the pixel quality map is initially filled with values of zero (e.g., shown as black), given that no pixels have been generated so far.

Image 608 corresponds to an estimated pixel quality map associated with viewpoint 1. White indicates a high pixel quality value, while black indicates a very poor pixel quality value (see, e.g., FIG. 4 for a description for how the estimated pixel quality map is generated).

Image 610 corresponds to the refine mask computed based on the cumulative pixel quality map and on the estimated pixel quality map associated with viewpoint 1. In the context of refine masks, white indicates missing (e.g., not generated) pixels that should be entirely generated, black indicates a texture portion that should be left untouched, and values between white and black indicate that corresponding texture regions that should be refined. Here, FIG. 6 corresponds to a first viewpoint corresponding to the first iteration of the texture generation process. Thus, the refine mask indicates that all pixels (e.g., all texture portions) should be generated, as no pixels have been generated so far—this corresponds to the result of comparing the values in the two pixel quality masks as described in FIG. 3. The indication that all pixels should be generated is illustrated by the all-white refine mask rendering, with the black border added for visualization only.

Image 612 (image on the left in FIG. 7) corresponds to a new texture image, generated with respect to viewpoint 1. The texture generation system 208 uses an image generation method that takes parameters such as the object depth map, the cumulative texture rendered from viewpoint 1, and the refine mask, and generates the new texture image associated with viewpoint 1.

Image 614 (image on the right in FIG. 7) shows the result of the new texture image being projected to the UV space associated with the object and used to update the cumulative texture. Subsequent to the update, the cumulative texture can be seen to incorporate the result of the first image generation iteration.

Image 616 (see image in FIG. 8) showcases the result of the new pixel quality map associated with the new texture (e.g., the estimated pixel quality map) being projected to the UV space associated with the object and used to update the cumulative pixel quality map.

FIG. 9 is an illustration 900 of aspects of a texture generation method 300, according to some examples, as implemented by a texture generation system 208. In this example, viewpoint 2 corresponds to a new viewpoint used in the second iteration of a run by a texture generation system 208. Viewpoint 2 corresponds to a slightly to the side view of the target object. Example aspects for a first iteration of the run can be seen in FIG. 6, FIG. 7 and FIG. 8. Example aspects for a third iteration can be seen in FIG. 10.

Image 902 corresponds to an object depth map viewed from viewpoint 2.

Image 904 corresponds to a rendering, from viewpoint 2, of the current version of the cumulative texture associated with the object. The cumulative texture corresponds to the current version of the object appearance, accumulating the results of previous texture generation iterations (here, one previous iteration as seen in FIG. 6). Here, black color portions correspond to parts not previously generated and/or parts that were not visible from previous viewpoints (e.g., from viewpoint 1). Portions of the texture image in 904 (e.g., side of head) show some stretching artifacts, due to their being previously viewed from a poor angle, while others do not, due to their previously being seen from a good angle.

Image 906 corresponds to the current version of the cumulative pixel quality map associated with the cumulative texture (in this case, integrating only one previous viewpoint). Black areas of the depicted cumulative pixel quality map correspond to unseen texture parts, white areas to parts previously seen from a good angle, and gray ones to parts seen from intermediate angles.

Image 908 corresponds to the estimated pixel quality map associated with a new texture image to be generated from viewpoint 2 (see, e.g., FIG. 4 for details with respect to the estimated pixel quality map). As illustrated, map regions corresponding to object parts visible at the second iteration from a better angle are white (see, e.g., side of head). Such map regions correspond to texture and/or object parts facing the new viewpoint 2.

Image 910 corresponds to the refine mask computed based on the cumulative pixel quality map associated with the cumulative texture and on the estimated pixel quality map associated with viewpoint 2. White indicates cumulative texture portions that are missing and should be entirely generated, black indicates cumulative texture image portions that should be left untouched, and/or intermediate values between white and black indicate texture image regions that should be refined.

Image 912 corresponds to a new texture image, generated from viewpoint 2 using the image generation method (sec, e.g., FIG. 6). At this second iteration, the image generation method takes as parameters such the object depth map corresponding to viewpoint 2, the cumulative texture image seen from viewpoint 2, the refine mask, and/or image generation parameters.

Image 914 corresponds to the result of the new texture image being projected to the UV space and used to update the cumulative texture, which now includes the result of the new texture generation operation. The left side of the object face appears better covered (e.g., compared to image 904).

Image 916 shows the result of the new pixel quality map (e.g., the estimated pixel quality map associated with viewpoint 2), being projected to the UV space of the object and being used to update the cumulative pixel quality map. Comparing this updated version of the cumulative pixel quality map with the cumulative pixel quality map after the first iteration of the texture generation process (sec., e.g., image 616) shows the impact of generating an additional texture image from a new viewpoint. For example, more portions of the cumulative texture are filled in, corresponding to better coverage for the object.

FIG. 10 is an illustration 1000 of aspects of a texture generation method 300, according to some examples, as implemented by a texture generation system 208. In this example, viewpoint 3 corresponds to a new viewpoint used in the third iteration of a run by a texture generation system 208. Here, viewpoint 3 corresponds to a viewpoint further to the side (with respect to viewpoint 2 and/or viewpoint 1). Example aspects for the first two runs can be seen in FIG. 6-FIG. 9. Images 1002-1016 illustrate similar aspects and/or outputs of the process as images 902-916, updated for the new iteration.

As FIG. 10 illustrates, a new texture image generated from viewpoint 3 based on the cumulative texture so far, a refine mask and/or other image parameters for the image generation method is coherent and of good quality (see, e.g., image 1012). Furthermore, the cumulative texture image has significantly more and/or better coverage by the end of the third iteration (e.g., after accumulating texture generation outputs for the three iterations)—see, e.g., image 1014, corresponding to the UV space version of the cumulative texture after three iterations, as compared to images 614 and 914.

FIG. 11 is an illustration 1100 of aspects of a method for projecting an image of an object from view space to UV space, according to some examples, as implemented by the UV projection module 204 of the texture generation system 208.

In some examples, the UV projection module 204 implements the method with the following results: the object (e.g., mesh) is flattened following the UV space; it is rendered using as texture the image from view space; the object UV coordinates are modified in order to effectively project the image from the camera view. For example, image 1102 corresponds to an image of a cat in view space that is projected to UV space as seen in image 1104.

In some examples, the UV projection module 204 implements the projection using one or more shaders. The UV projection module 204 first uses a vertex shader and/or shader interpolation to pass the 3D positions of object vertices (e.g., 3D mesh vertices) to a fragment shader. The 3D positions of the vertices are modified, in the vertex shader, to use the original object UV positions instead, which results in flattening the object as in the UV space. The 3D positions of the object vertices passed to the fragment shader are projected to the view space. The projected positions of the object vertices are used as UV coordinates for the image in the view space. The object is then rendered in the absence of any additional transformation. Thus, UV projection module 204 generates or obtains a texture for the object such that, if viewed from the original camera view (viewpoint), the object would look as in the original view space image.

In some examples, UV projection module 204 uses culling to limit the projection to only object fragments (e.g., points, triangles, etc) visible from the camera viewpoint. The UV projection module 204 computes an occlusion mask in the UV space to apply to the projected texture. First, given the camera viewpoint, the system renders a floating point texture that contains the 3D positions of the object fragments (e.g., points on the object surface and/or mesh surface) visible in view space. The core UV projection method above is used to project the floating point texture to the UV space, resulting in a first texture (or map) including 3D positions of the visible fragments in the UV space. In some examples, since projection does not take occlusion into account, this first texture includes 3D positions for fragments that were not visible but received non-zero values from the visible fragments. Using the same "interpolation" operation as in the UV projection operations above, the system renders the 3D position of each fragment again, but flattens the mesh in the vertex shader state to generate the 3D positions of all fragments in the UV space as part of generating a second texture. This time, each pixel of this second texture has a valid unique value over the object islands or regions. The system computes a binary occlusion mask by comparing both the first texture with the second texture (e.g., using a pre-determined thresholding to account for rounding errors). For each pixel in the texture(s), if the corresponding texture values are equal for the two textures, this means that the pixel was visible (e.g., corresponded to a visible point), leading to a mask value of 1, otherwise it was not visible, leading to a mask value of 0. The occlusion mask is applied to the UV space texture image projection (e.g., the first texture described above) in order to generate a projected texture image that only contains pixel information corresponding to object parts, fragments or points visible from the current camera viewpoint.

The bottom series of images in FIG. 11 illustrates partial outputs corresponding to the method above. Image 1106 shows 3D positions in view space or render space; image 1108 shows 2D positions projected from the view space to UV space (visible portions); image 1110 shows 3D positions in UV space (all portions); image 1112 shows the computed occlusion mask.

FIG. 12 illustrates an example refine mask, according to some examples, as computed by a refine mask module 206 module of the texture generation system 208. Image 1202 corresponds to a cumulative pixel quality map in a UV space associated with the object. Image 1204 corresponds to a rendering, in view space, of the cumulative pixel quality map for a new viewpoint. Image 1206 corresponds to an estimated pixel quality map associated with the new viewpoint (e.g., rendered in view space). Image 1208 corresponds to a refine mask (or map) computed by comparing the cumulative pixel quality map and the estimated pixel quality map, as detailed in the FIG. 3 discussion.

FIG. 13 is an illustration 1300 of aspects of an image generation method that uses a refine mask, according to some examples. In some examples, the texture generation system 208, via its image generation module 202, uses an augmented version of a diffusion model (e.g., Stable Diffusion) for image generation purposes (e.g., for texture image generation). The diffusion model can be used, in some examples, for its inpainting capability. In some examples, inpainting refers to generating a new image from an existing image by replacing parts of the original, while maintaining a degree of overall consistency. In some examples, inpainting uses binary masks, whose values indicate either the preservation or the replacement of specific pixels or regions in the existing image.

In some examples, the texture generation system 208 adjusts the diffusion process (e.g., as implemented by Stable Diffusion) to enable the refinement of an original image (e.g, a texture). Refinement refers to regenerating parts of an image while preserving the original content in large extent, with the fidelity depending on each individual part of the image. In some examples, the refinement is enabled by the use of a mask of continuous values (e.g., a refine mask as described at least in FIG. 3).

In some examples, the texture generation system 208 uses an inpainting model such as the inpainting Stable Diffusion model, which differs from the basic Stable Diffusion model by taking extra channels as inputs in a latent space, with the extra channels representing an original image (e.g., a texture to be refined) and the refine mask itself. In some examples, the original image is masked (e.g., the refine mask is applied to the image) before the image being supplied as input to the inpainting Stable Diffusion model. At each diffusion step, the image and the refine mask are updated as described below in order to simulate a continuous mask (e.g., while leveraging a binary mask inpainting model).

Before or at the first diffusion step in the diffusion process, a threshold is initialized with a predetermined high value. At the time of the first diffusion step, the threshold is applied to the refine mask and/or used to compute a binary mask, indicating only areas of the existing image in need of a full override (e.g., image areas that should be generated or regenerated). In some examples, the binary mask is applied to the existing image, resulting in a masked image. In some examples, the latents (representations in latent space) of the binary mask and/or mask image are generated. The diffusion step of the inpainting model proceeds with inputs including one or more of the binary mask, the masked image, and/or the latents of the binary mask and/or masked image.

At one or more following steps, the threshold value is increasingly lowered, resulting in updates to the refine mask and/or binary mask that lead to the masked area being increasingly updated (e.g., slightly growing, etc.)—see, e.g., an example binary mask being updated in the progression of images 1302 through 1306. As a result of the changes in the binary mask and/or corresponding masked image, different parts of the existing image are refined at different diffusion steps.

In some examples, the texture generation system 208 implements additional masking operations to blend a generated image with an input image (e.g., an existing image), and thereby preserve more of the original content of the input image. In some examples, the texture generation system 208 uses soft masks to improve transitions between an existing image and a generated image.

FIG. 14 is an illustration 1400 of aspects of a texture fusing method, according to some examples. As seen at least in FIG. 3, the texture generation system 208 generates (or synthesizes) a new texture corresponding to a new viewpoint. In some examples, the texture generation system 208 projects the new, synthesized texture image to the UV space associated with the object. (e.g., the cumulative texture space). The texture generation system 208 blends or fuses the projected new texture image with the cumulative texture to obtain an updated version of the cumulative texture image (e.g., the Diffuse texture), which incorporates the newly generated view from the new viewpoint. Image 1402 corresponds to the current, cumulative texture image. Image 1404 corresponds to an example projection to UV space of the new texture image synthesized for the new viewpoint. Image 1406 corresponds to the output, updated cumulative texture.

In some examples, the texture generation system 208 operates as described in the following. For each pixel in the cumulative texture:

a) if the pixel was not seen from the new viewpoint (e.g., as determined using a culling mask), the respective pixel value in the updated cumulative texture is the corresponding pixel value in the existing cumulative texture;
b) if the corresponding new viewpoint pixel is of higher quality or equal quality (e.g., based on the estimated pixel quality map for the new viewpoint) with respect to the pixel in the cumulative texture, the pixel value in the updated cumulative texture is set to be the pixel value in the new texture image;
c) if the corresponding new viewpoint pixel is of lower quality (e.g., based on the estimated pixel quality map) than the pixel in the cumulative texture, but the quality difference is smaller than a pre-determined threshold, the pixel value in the updated cumulative texture is computed using a linear blending of the pixel values in the cumulative texture and the new texture. The linear blending allows for smoother transitions between fused textures. If the quality difference exceeds the pre-determined threshold, the pixel value in the updated cumulative texture can be the corresponding pixel value from the existing cumulative texture.

In some examples, the texture generation system 208 uses a similar process to combine a cumulative pixel quality map and an estimated pixel quality map. For each entry in the cumulative pixel quality map:

a) if the corresponding pixel was not seen from the new viewpoint, the respective value in the updated cumulative pixel quality map is the corresponding pixel quality value in the cumulative pixel quality map;
b) if the corresponding new viewpoint pixel is of higher quality or equal quality with respect to the pixel in the current cumulative texture, the pixel quality value in the updated cumulative pixel quality map is set to be the pixel quality value in the estimated pixel quality map;
c) if the corresponding new viewpoint pixel is of lower quality than the pixel in the cumulative texture, but the quality difference is smaller than a pre-determined threshold, the pixel quality value in the updated cumulative pixel quality map can be computed using a linear blending of the pixel quality values in the cumulative pixel quality map and the estimated pixel quality map. If the quality difference exceeds the pre-determined threshold, the value in the updated cumulative pixel quality map remains the corresponding pixel quality value in the cumulative pixel quality map.

FIG. 15 is an illustration of a UI screen 1500 for a texture generation system 208, according to some examples. Image 1502 corresponds to a cumulative texture of a cat as seen from a new viewpoint (e.g., a side view). In some examples, a user can directly modify the appearance (e.g., texture) of the cat, for example by indicating color or other characteristics. In this example, the user indicates that one of the eyes should be of a specific color (sec, e.g., element 1504) by directly updating the current version of the cumulative texture of the cat. Additionally, the cumulative texture includes areas that should be regenerated (or generated), such as those associated with element 1506.

FIG. 16 is an illustration of a UI screen 1600 for a texture generation system 208, according to some examples. Image 1602 corresponds to a newly generated texture image associated with the new viewpoint. The generation of the new texture image can take into account the guidance provided by a refine mask that indicates which parts of the texture image should be kept, generated, or refined. The generation of the new texture image can also include additional user input, such as the color use indicated in 1504. Thus, the newly generated or synthesized texture exhibits the improvements and the newly generated or synthesized texture image now appears to have an eye of the color indicated by the user (see, e.g., element 1508). Furthermore, the new texture image has more coherent, filled in appearance, as evidenced by the difference between the area 1506 in FIG. 15 and the corresponding area 1606 in FIG. 16.

FIG. 17 is a block diagram illustrating an example of a software architecture 1702 that may be installed on a machine, according to some example embodiments. FIG. 17 is merely a non-limiting example of software architecture, and it will be appreciated that many other architectures may be implemented to facilitate the functionality described herein. The software architecture 1702 may be executing on hardware such as a machine 1800 of FIG. 18 that includes, among other things, processors 1804, memory/storage 1806, and input/output I/O components 1818. A representative hardware layer 1734 is illustrated and can represent, for example, the machine of FIG. 18. The representative hardware layer 1734 comprises one or more processing units 1750 having associated executable instructions 1736. The executable instructions 1736 represent the executable instructions of the software architecture 1702. The hardware layer 1734 also includes memory or memory storage 1752, which also have the executable instructions 1738. The hardware layer 1734 may also comprise other hardware 1754, which represents any other hardware of the hardware layer 1734 such as the other hardware illustrated as part of the machine 1800.

In the example architecture of FIG. 17, the software architecture 1702 may be conceptualized as a stack of layers, where each layer provides particular functionality. For example, the software architecture 1702 may include layers such as an operating system 1730, libraries 1718, frameworks/middleware 1716, applications 1710, and a presentation layer 1708. Operationally, the applications 1710 or other components within the layers may invoke API calls 1758 through the software stack and receive a response, returned values, and so forth (illustrated as messages 1756) in response to the API calls 1758. The layers illustrated are representative in nature, and not all software architectures have all layers. For example, some mobile or special-purpose operating systems may not provide a frameworks/middleware 1716 layer, while others may provide such a layer. Other software architectures may include additional or different layers.

The operating system 1730 may manage hardware resources and provide common services. The operating system 1730 may include, for example, a kernel 1746, services 1748, and drivers 1732. The kernel 1746 may act as an abstraction layer between the hardware and the other software layers. For example, the kernel 1746 may be responsible for memory management, processor management (e.g., scheduling), component management, networking, security settings, and so on. The services 1748 may provide other common services for the other software layers. The drivers 1732 may be responsible for controlling or interfacing with the underlying hardware. For instance, the drivers 1732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1718 may provide a common infrastructure that may be utilized by the applications 1710 and/or other components and/or layers. The libraries 1718 typically provide functionality that allows other software modules to perform tasks in an easier fashion than by interfacing directly with the underlying operating system 1730 functionality (e.g., kernel 1746, services 1748 or drivers 1732). The libraries 1718 may include system libraries 1718 (e.g., C standard library) that may provide functions such as memory allocation functions, string manipulation functions, mathematic functions, and the like. In addition, the libraries 1718 may include API libraries 1028 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1718 may also include a wide variety of other libraries 1722 to provide many other APIs to the applications 1710 or applications 1712 and other software components/modules.

The frameworks 1714 (also sometimes referred to as middleware) may provide a higher-level common infrastructure that may be utilized by the applications 1710 or other software components/modules. For example, the frameworks 1714 may provide various graphical user interface functions, high-level resource management, high-level location services, and so forth. The frameworks 1714 may provide a broad spectrum of other APIs that may be utilized by the applications 1710 and/or other software components/modules, some of which may be specific to a particular operating system or platform.

The applications 1710 include built-in applications 1740 and/or third-party applications 1742. Examples of representative built-in applications 1740 may include, but are not limited to, a home application, a contacts application, a browser application, a book reader application, a location application, a media application, a messaging application, or a game application.

The third-party applications 1742 may include any of the built-in applications 1740 as well as a broad assortment of other applications. In a specific example, the third-party applications 1742 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 1742 may invoke the API calls 1758 provided by the mobile operating system such as the operating system 1730 to facilitate functionality described herein.

The applications 1710 may utilize built-in operating system functions, libraries (e.g., system libraries 1724, API libraries 1726, and other libraries), or frameworks/middleware 1716 to create user interfaces to interact with users of the system. Alternatively, or additionally, in some systems, interactions with a user may occur through a presentation layer, such as the presentation layer 1708. In these systems, the application/module "logic" can be separated from the aspects of the application/module that interact with the user.

Some software architectures utilize virtual machines. In the example of FIG. 17, this is illustrated by a virtual machine 1704. The virtual machine 1704 creates a software environment where applications/modules can execute as if they were executing on a hardware machine. The virtual machine 1704 is hosted by a host operating system (e.g., the operating system 1730) and typically, although not always, has a virtual machine monitor 1728, which manages the operation of the virtual machine 1704 as well as the interface with the host operating system (e.g., the operating system 1730). A software architecture executes within the virtual machine 1704, such as an operating system 1730, libraries 1718, frameworks/middleware 1716, applications 1712, or a presentation layer 1708. These layers of software architecture executing within the virtual machine 1704 can be the same as corresponding layers previously described or may be different.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1810 (e.g., software, a program, an application, an applet, an app, or other executable code) for causing the machine 1800 to perform any one or more of the methodologies discussed herein may be executed. As such, the instructions 1810 may be used to implement modules or components described herein. The instructions 1810 transform the general, non-programmed machine 1800 into a particular machine 1800 to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1810, sequentially or otherwise, that specify actions to be taken by machine 1800. Further, while only a single machine 1800 is illustrated, the term "machine" shall also be taken to include a collection of machines that individually or jointly execute the instructions 1810 to perform any one or more of the methodologies discussed herein.

The machine 1800 may include processors 1804, memory/storage 1806, and I/O components 1818, which may be configured to communicate with each other such as via a bus 1802. The memory/storage 1806 may include a memory 1814, such as a main memory, or other memory storage, and a storage unit 1816, both accessible to the processors 1804 such as via the bus 1802. The storage unit 1816 and memory 1814 store the instructions 1810 embodying any one or more of the methodologies or functions described herein. The instructions 1810 may also reside, completely or partially, within the memory 1814 within the storage unit 1816, within at least one of the processors 1804 (e.g., within the processor's cache memory), or any suitable combination thereof, during execution thereof by the machine 1800. Accordingly, the memory 1814 the storage unit 1816, and the memory of processors 1804 are examples of machine-readable media.

The I/O components 1818 may include a wide variety of components to receive input, provide output, produce output, transmit information, exchange information, capture measurements, and so on. The specific I/O components 1818 that are included in a particular machine 1800 will depend on the type of machine. For example, portable machines such as mobile phones will likely include a touch input device or other such input mechanisms, while a headless server machine will likely not include such a touch input device. It will be appreciated that the I/O components 1818 may include many other components that are not shown in FIG. 18. The I/O components 1818 are grouped according to functionality merely for simplifying the following discussion and the grouping is in no way limiting. In various example embodiments, the I/O components 1818 may include output components 1826 and input components 1828. The output components 1826 may include visual components (e.g., a display such as a plasma display image (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1818 may include biometric components 1830, motion components 1834, environmental environment components 1836, or position components 1838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1834 may include acceleration sensor components (e.g., accelerometer), gravitation sensor components, rotation sensor components (e.g., gyroscope), and so forth. The environment components 1836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1838 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1818 may include communication components 1840 operable to couple the machine 1800 to a network 1832 or devices 1820 via coupling 1822 and coupling 1824 respectively. For example, the communication components 1840 may include a network interface component or other suitable device to interface with the network 1832. In further examples, communication components 1840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1820 may be another machine or any of a wide variety of peripheral devices (e.g., a peripheral device coupled via a Universal Serial Bus (USB)).

Moreover, the communication components 1840 may detect identifiers or include components operable to detect identifiers. For example, the communication components 1840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1840, such as, location via Internet Protocol (IP) geo-location, location via Wi-Fi® signal triangulation, location via detecting a NFC beacon signal that may indicate a particular location, and so forth.

FIG. 19 is a block diagram showing a machine-learning program 1900 according to some examples. The machine-learning programs 1900, also referred to as machine-learning algorithms or tools, are used to train machine learning models, which can be used by a texture generation system 208, as described in FIG. 2.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine-learning tools operate by building a model from example training data 1908 in order to make data-driven predictions or decisions expressed as outputs or assessments (e.g., assessment 1916). Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), Gradient Boosted Decision Trees (GBDT), neural networks (NN), matrix factorization, and Support Vector Machines (SVM) tools may be used. In some examples, one or more ML paradigms may be used: binary or n-ary classification, semi-supervised learning, etc. In some examples, time-to-event (TTE) data will be used during model training. In some examples, a hierarchy or combination of models (e.g. stacking, bagging) may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning program 1900 supports two types of phases, namely a training phase 1902 and prediction phase 1904. In a training phase 1902, supervised learning, unsupervised or reinforcement learning may be used. For example, the machine-learning program 1900 (1) receives features 1906 (e.g., as structured or labeled data in supervised learning) and/or (2) identifies features 1906 (e.g., unstructured or unlabeled data for unsupervised learning) in training data 1908. In a prediction phase 1904, the machine-learning program 1900 uses the features 1906 for analyzing query data 1912 to generate outcomes or predictions, as examples of an assessment 1916.

In the training phase 1902, feature engineering is used to identify features 1906 and may include identifying informative, discriminating, and independent features for the effective operation of the machine-learning program 1900 in pattern recognition, classification, and regression. In some examples, the training data 1908 includes labeled data, which is known data for pre-identified features 1906 and one or more outcomes. Each of the features 1906 may be a variable or attribute, such as individual measurable property of a process, article, system, or phenomenon represented by a data set (e.g., the training data 1908). Features 1906 may also be of different types, such as numeric features, strings, and graphs, and may include one or more of content 1918, concepts 1920, attributes 1922, historical data 1924 and/or user data 1926, merely for example.

In training phases 1902, the machine-learning program 1900 uses the training data 1908 to find correlations among the features 1906 that affect a predicted outcome or assessment 1916.

With the training data 1908 and the identified features 1906, the machine-learning program 1900 is trained during the training phase 1902 at machine-learning program training 1910. The machine-learning program 1900 appraises values of the features 1906 as they correlate to the training data 1908. The result of the training is the trained machine-learning program 1914 (e.g., a trained or learned model).

Further, the training phases 1902 may involve machine learning, in which the training data 1908 is structured (e.g., labeled during preprocessing operations), and the trained machine-learning program 1914 implements a relatively simple neural network 1928 (or one of other machine learning models, as described herein) capable of performing, for example, classification and clustering operations. In other examples, the training phase 1902 may involve deep learning, in which the training data 1908 is unstructured, and the trained machine-learning program 1914 implements a deep neural network 1928 that is able to perform both feature extraction and classification/clustering operations.

A neural network 1928 generated during the training phase 1902, and implemented within the trained machine-learning program 1914, may include a hierarchical (e.g., layered) organization of neurons. For example, neurons (or nodes) may be arranged hierarchically into a number of layers, including an input layer, an output layer, and multiple hidden layers. The layers within the neural network 1928 can have one or many neurons, and the neurons operationally compute a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which define the influence of the input from a transmitting neuron to a receiving neuron.

In some examples, the neural network 1928 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

During prediction phases 1904 the trained machine-learning program 1914 is used to perform an assessment. Query data 1912 is provided as an input to the trained machine-learning program 1914, and the trained machine-learning program 1914 generates the assessment 1916 as output, responsive to receipt of the query data 1912.

Example: Storing a Trained Model With ONNX File Format

A trained neural network model (e.g., a trained machine learning program 1914 using a neural network 1928) may be stored in a computational graph format, according to some examples. An example computational graph format is the Open Neural Network Exchange (ONNX) file format, an open, flexible standard for storing models which allows reusing models across deep learning platforms/tools, and deploying models in the cloud (e.g., via ONNX runtime).

In some examples, the ONNX file format corresponds to a computational graph in the form of a directed graph whose nodes (or layers) correspond to operators and whose edges correspond to tensors. In some examples, the operators (or operations) take the incoming tensors as inputs, and output result tensors, which are in turn used as inputs by their children.

In some examples, trained neural network models (e.g., examples of trained machine learning programs 1914) developed and trained using frameworks such as TensorFlow, Keras, PyTorch, and so on can be automatically exported to the ONNX format using framework-specific export functions. For instance, PyTorch allows the use of a torch.export(trainedModel, output File ( . . . )) function to export a trained model ready to be run to a file using the ONNX file format. Similarly, TensorFlow and Keras allow the use of the tf2onnx library for converting trained models to the ONNX file format, while Keras also allows the use of keras2onnx for the same purpose.

In example embodiments, one or more artificial intelligence agents, such as one or more machine-learned algorithms or models and/or a neural network of one or more machine-learned algorithms or models may be trained iteratively (e.g., in a plurality of stages) using a plurality of sets of input data. For example, a first set of input data may be used to train one or more of the artificial agents. Then, the first set of input data may be transformed into a second set of input data for retraining the one or more artificial intelligence agents. The continuously updated and retrained artificial intelligence agents may then be applied to subsequent novel input data to generate one or more of the outputs described herein.

EXAMPLES

Example 1 is a non-transitory computer-readable storage medium storing instructions that, when executed by at least one processor, cause the at least one processor to perform operations comprising: rendering, at a viewpoint, one or more of an object depth and a cumulative texture associated with a cumulative pixel quality map; determining an estimated pixel quality map associated with the viewpoint; generating, at the viewpoint, a new texture associated with an object based on one or more of the object depth, the cumulative texture, and a refine mask; updating the cumulative texture based on the new texture; and updating the cumulative pixel quality map based on the estimated pixel quality map.

In Example 2, the subject matter of Example 1 includes, wherein the estimated pixel quality map associated with the viewpoint is computed based on one or more of position data associated with the viewpoint, a cumulative texture resolution, a new texture resolution, and a mapping from a view space associated with generating the new texture to a texture space associated with the cumulative texture.

In Example 3, the subject matter of Example 2 includes, wherein computing the estimated pixel quality map associated with the viewpoint further comprises: computing a position of a pixel to be rendered from the viewpoint based on pixel coordinates in the texture space and on the cumulative texture resolution; computing a pixel quality ratio based on a maximum magnitude of discrete derivatives of the position of the pixel along a first coordinate axis and a second coordinate axis; computing an indicator of a facing direction of the pixel with respect to the viewpoint; and computing an estimated pixel quality value based on the pixel quality ratio and the indicator of the facing direction of the pixel with respect to the viewpoint.

In Example 4, the subject matter of Examples 1-3 includes, the operations further comprising computing the refine mask based on the cumulative pixel quality map and the estimated pixel quality map, the computing of the refine mask comprising: based on determining that a pixel quality value in the cumulative pixel quality map indicates a pixel has not been generated at a previous viewpoint, setting a refine mask value for the pixel to be a first value indicating the pixel is to be generated; based on determining that the pixel quality value in the cumulative pixel quality map is greater or equal to a corresponding pixel quality value in the estimated pixel quality map, setting the refine mask value for the pixel to be a second value indicating the pixel is not to be updated; and based on determining that the pixel quality value in the cumulative pixel quality map is lower than a corresponding pixel quality value in the estimated pixel quality map, setting the refine mask value for the pixel to be a third value indicating the pixel is to be refined.

In Example 5, the subject matter of Examples 1-4 includes, the operations further comprising using an image generation model to generate the new texture, the image generation model further using image generation parameters comprising at least one of a natural language (NL) input or a number of iterations.

In Example 6, the subject matter of Examples 1-5 includes, wherein generating the new texture further comprises: generating a binary mask based on the refine mask and a threshold; at each iteration of a plurality of iterations of an inpainting diffusion model for image generation: generating a masked texture based on the cumulative texture and the binary mask; generating a version of the new texture based on the masked texture and the binary mask; and updating the binary mask based on the refine mask and on updating the threshold; and selecting as the new texture the version of the new texture generated at a last iteration of the plurality of iterations.

In Example 7, the subject matter of Examples 2-6 includes, the operations further comprising: projecting, using the mapping, the new texture from the view space to the texture space to generate a projected new texture; and projecting, using the mapping, the estimated pixel quality map from the view space to the texture space to generate a projected new pixel quality map.

In Example 8, the subject matter of Example 7 includes, wherein the operations further comprise: using one of an angle-based mapping or a Least Squares Conformal Mapping (LSCM); and applying an occlusion mask to the projected new texture to generate a modified new texture, the modified new texture excluding object fragments not visible from the viewpoint.

In Example 9, the subject matter of Examples 7-8 includes, wherein: updating the cumulative texture further comprises updating, in the texture space, the cumulative texture based on the projected new texture; and updating the cumulative pixel quality map further comprises updating, in the texture space, the cumulative pixel quality map based on the projected new pixel quality map.

In Example 10, the subject matter of Example 9 includes, wherein updating, in the texture space, the cumulative texture based on the projected new texture further comprises computing an updated value of a pixel of the cumulative texture, the computing of the updated value comprising: based on determining the pixel was not generated for the projected new texture, retaining, as the updated value, a value of the pixel of the cumulative texture; based on determining that a pixel quality value of the pixel of the cumulative texture is lower than a pixel quality value of a corresponding pixel of the projected new texture, setting the updated value to be the value of the corresponding pixel of the projected new texture; and based on determining that the pixel quality value of the pixel of the cumulative texture is higher than the pixel quality value of a corresponding pixel of the projected new texture and that an absolute value of the difference between the respective pixel values is lower than a predetermined threshold, setting the updated value to be a linear combination of the value of the pixel for the projected new texture and the value of the pixel for the cumulative texture.

In Example 11, the subject matter of Examples 1-10 includes, the operations further comprising: rendering, at an additional viewpoint, one or more of an additional object depth and the cumulative texture; determining an additional estimated pixel quality map associated with the additional viewpoint; generating, at the additional viewpoint, an additional texture associated with the object based on one or more of the additional object depth, the cumulative texture, and an additional refine mask; updating the cumulative texture based on the additional texture; and updating the cumulative pixel quality map based on the additional estimated pixel quality map.

Example 12 is at least one non-transitory machine-readable medium (or computer readable medium) including instructions that, when executed by processing circuitry, cause the processing circuitry to perform operations to implement of any of Examples 1-11.

Example 13 is an apparatus comprising means to implement any of Examples 1-11.

Example 14 is a system to implement any of Examples 1-11.

Example 15 is a method to implement any of Examples 1-11.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

"SHADER" in this context refers to a program that runs on a GPU, a CPU, a TPU and so forth. In the following, a non-exclusive listing of types of shaders is offered. Shader programs may be part of a graphics pipeline. Shaders may also be compute shaders or programs that perform calculations on a CPU or a GPU (e.g., outside of a graphics pipeline, etc.). Shaders may perform calculations that determine pixel properties (e.g., pixel colors). Shaders may refer to ray tracing shaders that perform calculations related to ray tracing. A shader object may (e.g., an instance of a shader class) may be a wrapper for shader programs and other information. A shader asset may refer to a shader file (or a ".shader" extension file), which may define a shader object.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A non-transitory computer-readable storage medium storing instructions that, when executed by at least one processor, cause the at least one processor to perform operations comprising:

rendering, at a viewpoint, one or more of an object depth and a cumulative texture associated with a cumulative pixel quality map;

determining an estimated pixel quality map associated with the viewpoint, wherein the estimated pixel quality map associated with the viewpoint is computed based on one or more of position data associated with the viewpoint, a cumulative texture resolution, a new texture resolution, and a mapping from a view space associated with generating the new texture to a texture space associated with the cumulative texture;

generating, at the viewpoint, a new texture associated with an object based on one or more of the object depth, the cumulative texture, and a refine mask;

updating the cumulative texture based on the new texture; and updating the cumulative pixel quality map based on the estimated pixel quality map.

2. The non-transitory computer-readable storage medium of claim 1, wherein computing the estimated pixel quality map associated with the viewpoint further comprises:

computing a position of a pixel to be rendered from the viewpoint based on pixel coordinates in the texture space and on the cumulative texture resolution;

computing a pixel quality ratio based on a maximum magnitude of discrete derivatives of the position of the pixel along a first coordinate axis and a second coordinate axis;

computing an indicator of a facing direction of the pixel with respect to the viewpoint; and computing an estimated pixel quality value based on the pixel quality ratio and the indicator of the facing direction of the pixel with respect to the viewpoint.

3. The non-transitory computer-readable storage medium of claim 1, the operations further comprising computing the refine mask based on the cumulative pixel quality map and the estimated pixel quality map, the computing of the refine mask comprising:

based on determining that a pixel quality value in the cumulative pixel quality map indicates a pixel has not been generated at a previous viewpoint, setting a refine mask value for the pixel to be a first value indicating the pixel is to be generated;

based on determining that the pixel quality value in the cumulative pixel quality map is greater or equal to a corresponding pixel quality value in the estimated pixel quality map, setting the refine mask value for the pixel to be a second value indicating the pixel is not to be updated; and based on determining that the pixel quality value in the cumulative pixel quality map is lower than a corresponding pixel quality value in the estimated pixel quality map, setting the refine mask value for the pixel to be a third value indicating the pixel is to be refined.

4. The non-transitory computer-readable storage medium of claim 1, the operations further comprising using an image generation model to generate the new texture, the image generation model further using image generation parameters comprising at least one of a natural language (NL) input or a number of iterations.

5. The non-transitory computer-readable storage medium of claim 1, wherein generating the new texture further comprises:

generating a binary mask based on the refine mask and a threshold;

at each iteration of a plurality of iterations of an inpainting diffusion model for image generation:

generating a masked texture based on the cumulative texture and the binary mask;

generating a version of the new texture based on the masked texture and the binary mask; and updating the binary mask based on the refine mask and on updating the threshold; and selecting as the new texture the version of the new texture generated at a last iteration of the plurality of iterations.

6. The non-transitory computer-readable storage medium of claim 1, the operations further comprising:

projecting, using the mapping, the new texture from the view space to the texture space to generate a projected new texture; and projecting, using the mapping, the estimated pixel quality map from the view space to the texture space to generate a projected new pixel quality map.

7. The non-transitory computer-readable storage medium of claim 6, wherein the operations further comprise:

using one of an angle-based mapping or a Least Squares Conformal Mapping (LSCM); and applying an occlusion mask to the projected new texture to generate a modified new texture, the modified new texture excluding object fragments not visible from the viewpoint.

8. The non-transitory computer-readable storage medium of claim 6, wherein:

updating the cumulative texture further comprises updating, in the texture space, the cumulative texture based on the projected new texture; and updating the cumulative pixel quality map further comprises updating, in the texture space, the cumulative pixel quality map based on the projected new pixel quality map.

9. The non-transitory computer-readable storage medium of claim 8, wherein updating, in the texture space, the cumulative texture based on the projected new texture further comprises computing an updated value of a pixel of the cumulative texture, the computing of the updated value comprising:

based on determining the pixel was not generated for the projected new texture, retaining, as the updated value, a value of the pixel of the cumulative texture;

based on determining that a pixel quality value of the pixel of the cumulative texture is lower than a pixel quality value of a corresponding pixel of the projected new texture, setting the updated value to be the value of the corresponding pixel of the projected new texture; and based on determining that the pixel quality value of the pixel of the cumulative texture is higher than the pixel quality value of a corresponding pixel of the projected new texture and that an absolute value of a difference between the respective pixel values is lower than a predetermined threshold, setting the updated value to be a linear combination of the value of the pixel for the projected new texture and the value of the pixel for the cumulative texture.

10. The non-transitory computer-readable storage medium of claim 1, the operations further comprising:

rendering, at an additional viewpoint, one or more of an additional object depth and the cumulative texture;

determining an additional estimated pixel quality map associated with the additional viewpoint;

generating, at the additional viewpoint, an additional texture associated with the object based on one or more of the additional object depth, the cumulative texture, and an additional refine mask;

updating the cumulative texture based on the additional texture; and updating the cumulative pixel quality map based on the additional estimated pixel quality map.

11. A method comprising:

rendering, at a viewpoint, one or more of an object depth and a cumulative texture associated with a cumulative pixel quality map;

determining an estimated pixel quality map associated with the viewpoint, wherein the estimated pixel quality map associated with the viewpoint is computed based on one or more of position data associated with the viewpoint, a cumulative texture resolution, a new texture resolution, and a mapping from a view space associated with generating the new texture to a texture space associated with the cumulative texture;

generating, at the viewpoint, a new texture associated with an object based on one or more of the object depth, the cumulative texture, and a refine mask;

updating the cumulative texture based on the new texture; and updating the cumulative pixel quality map based on the estimated pixel quality map.

12. The method of claim 11, wherein computing the estimated pixel quality map associated with the viewpoint further comprises:

computing a position of a pixel to be rendered from the viewpoint based on pixel coordinates in the texture space and on the cumulative texture resolution;

computing a pixel quality ratio based on a maximum magnitude of discrete derivatives of the position of the pixel along a first coordinate axis and a second coordinate axis;

computing an indicator of a facing direction of the pixel with respect to the viewpoint; and computing an estimated pixel quality value based on the pixel quality ratio and the indicator of the facing direction of the pixel with respect to the viewpoint.

13. The method of claim 11, further comprising computing the refine mask based on the cumulative pixel quality map and the estimated pixel quality map, the computing of the refine mask comprising:

based on determining that a pixel quality value in the cumulative pixel quality map indicates a pixel has not been generated at a previous viewpoint, setting a refine mask value for the pixel to be a first value indicating the pixel is to be generated;

based on determining that the pixel quality value in the cumulative pixel quality map is greater or equal to a corresponding pixel quality value in the estimated pixel quality map, setting the refine mask value for the pixel to be a second value indicating the pixel is not to be updated; and based on determining that the pixel quality value in the cumulative pixel quality map is lower than a corresponding pixel quality value in the estimated pixel quality map, setting the refine mask value for the pixel to be a third value indicating the pixel is to be refined.

14. The method of claim 11, wherein generating the new texture further comprises:

generating a binary mask based on the refine mask and a threshold;

at each iteration of a plurality of iterations of an inpainting diffusion model for image generation:

generating a masked texture based on the cumulative texture and the binary mask;

generating a version of the new texture based on the masked texture and the binary mask; and updating the binary mask based on the refine mask and on updating the threshold; and selecting as the new texture the version of the new texture generated at a last iteration of the plurality of iterations.

15. The method of claim 11, further comprising:

projecting, using the mapping, the new texture from the view space to the texture space to generate a projected new texture; and projecting, using the mapping, the estimated pixel quality map from the view space to the texture space to generate a projected new pixel quality map.

16. The method of claim 15, wherein:

updating the cumulative texture further comprises updating, in the texture space, the cumulative texture based on the projected new texture; and updating the cumulative pixel quality map further comprises updating, in the texture space, the cumulative pixel quality map based on the projected new pixel quality map.

17. The method of claim 16, wherein updating, in the texture space, the cumulative texture based on the projected new texture further comprises computing an updated value of a pixel of the cumulative texture, the computing of the updated value comprising:

based on determining the pixel was not generated for the projected new texture, retaining, as the updated value, a value of the pixel of the cumulative texture;

based on determining that a pixel quality value of the pixel of the cumulative texture is lower than a pixel quality value of a corresponding pixel of the projected new texture, setting the updated value to be the value of the corresponding pixel of the projected new texture; and based on determining that the pixel quality value of the pixel of the cumulative texture is higher than the pixel quality value of a corresponding pixel of the projected new texture and that an absolute value of a difference between the respective pixel values is lower than a predetermined threshold, setting the updated value to be a linear combination of the value of the pixel for the projected new texture and the value of the pixel for the cumulative texture.

18. A system comprising:

one or more computer processors;

one or more computer memories; and a set of instructions stored in the one or more computer memories, the set of instructions configuring the one or more computer processors to perform operations, the operations comprising:

rendering, at a viewpoint, one or more of an object depth and a cumulative texture associated with a cumulative pixel quality map;

determining an estimated pixel quality map associated with the viewpoint, wherein the estimated pixel quality map associated with the viewpoint is computed based on one or more of position data associated with the viewpoint, a cumulative texture resolution, a new texture resolution, and a mapping from a view space associated with generating the new texture to a texture space associated with the cumulative texture;

generating, at the viewpoint, a new texture associated with an object based on one or more of the object depth, the cumulative texture, and a refine mask;

updating the cumulative texture based on the new texture; and updating the cumulative pixel quality map based on the estimated pixel quality map.

* * * * *